United States Patent
Seo et al.

(10) Patent No.: US 9,030,957 B2
(45) Date of Patent: May 12, 2015

(54) APPARATUS AND METHOD FOR TRANSMITTING UPLINK CONTROL INFORMATION IN A MULTIPLE CARRIER SYSTEM

(75) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 105 days.

(21) Appl. No.: 13/811,208

(22) PCT Filed: Jul. 22, 2011

(86) PCT No.: PCT/KR2011/005428
§ 371 (c)(1),
(2), (4) Date: Jan. 18, 2013

(87) PCT Pub. No.: WO2012/011775
PCT Pub. Date: Jan. 26, 2012

(65) Prior Publication Data
US 2013/0114461 A1 May 9, 2013

Related U.S. Application Data

(60) Provisional application No. 61/366,918, filed on Jul. 22, 2010.

(51) Int. Cl.
| | | |
|---|---|---|
| *H04W 24/10* | (2009.01) | |
| *H04L 1/18* | (2006.01) | |
| *H04L 5/00* | (2006.01) | |
| *H04L 1/00* | (2006.01) | |
| *H04L 1/16* | (2006.01) | |

(52) U.S. Cl.
CPC .............. *H04W 24/10* (2013.01); *H04L 1/1861* (2013.01); *H04L 5/001* (2013.01); *H04L 5/0053* (2013.01); *H04L 1/0026* (2013.01); *H04L 1/0073* (2013.01); *H04L 1/1671* (2013.01)

(58) Field of Classification Search
None
See application file for complete search history.

(56) References Cited

U.S. PATENT DOCUMENTS

| | | | | |
|---|---|---|---|---|
| 7,623,489 | B2 * | 11/2009 | Ishii et al. | 370/329 |
| 8,041,364 | B2 * | 10/2011 | Wu et al. | 455/452.2 |
| 8,295,779 | B2 * | 10/2012 | Cave et al. | 455/69 |
| 8,488,538 | B2 * | 7/2013 | Ahn et al. | 370/329 |
| 8,649,343 | B2 * | 2/2014 | Ahn et al. | 370/329 |
| 8,767,647 | B2 * | 7/2014 | Heo et al. | 370/329 |

(Continued)

FOREIGN PATENT DOCUMENTS

| | | |
|---|---|---|
| CN | 101689984 A | 3/2010 |
| KR | 10-2009-0118072 A | 11/2009 |

(Continued)

*Primary Examiner* — Hassan Kizou
*Assistant Examiner* — Tejis Daya
(74) *Attorney, Agent, or Firm* — Birch, Stewart, Kolasch & Birch, LLP

(57) ABSTRACT

Provided are an apparatus and method for transmitting uplink control information (UCI) in a multiple carrier system. The method comprises the steps of: generating uplink control information for measuring a downlink component carrier (DL CC) set in a terminal; selecting a physical uplink shared channel (PUSCH) of one uplink component carrier from among PUSCHs of at least two uplink component carriers set in the terminal, according to a priority order; and transmitting the uplink control information through the PUSCH of the selected uplink component carrier.

10 Claims, 15 Drawing Sheets

(56) References Cited

U.S. PATENT DOCUMENTS

| | | |
|---|---|---|
| 2010/0113078 A1* | 5/2010 | Farajidana et al. ............ 455/507 |
| 2010/0272019 A1* | 10/2010 | Papasakellariou et al. ... 370/328 |
| 2011/0038271 A1* | 2/2011 | Shin et al. ..................... 370/252 |
| 2011/0141928 A1* | 6/2011 | Shin et al. ..................... 370/252 |
| 2011/0141959 A1* | 6/2011 | Damnjanovic et al. ....... 370/311 |
| 2011/0274043 A1* | 11/2011 | Nam et al. ..................... 370/328 |
| 2012/0002613 A1 | 1/2012 | Kishiyama et al. |
| 2012/0093097 A1* | 4/2012 | Che et al. ....................... 370/329 |
| 2012/0147778 A1 | 6/2012 | Ishii et al. |
| 2013/0016687 A1* | 1/2013 | Yang et al. ..................... 370/329 |
| 2013/0022007 A1* | 1/2013 | Berggren et al. ............. 370/329 |
| 2014/0016522 A1 | 1/2014 | Ahn et al. |

FOREIGN PATENT DOCUMENTS

| | | |
|---|---|---|
| KR | 10-2010-0050507 A | 5/2010 |
| KR | 10-2010-0052646 A | 5/2010 |
| KR | 10-2010-0058398 A | 6/2010 |
| WO | WO 2007/148945 A2 | 12/2007 |
| WO | WO 2010/048142 A1 | 4/2010 |
| WO | WO 2010/074500 A2 | 7/2010 |

* cited by examiner

FIG. 6

| | | |
|---|---|---|
| $N_{RB}^{UL}-1$ | 2/2a/2b #1 (m=1) | 2/2a/2b #0 (m=0) |
| $N_{RB}^{UL}-2$ | 1/1a/1b #0 (m=3) | 1/1a/1b+2/2a/2b (m=2) |
| $N_{RB}^{UL}-3$ | 1/1a/1b #2 (m=5) | 1/1a/1b #1 (m=4) |
| $N_{RB}^{UL}-4$ | | |
| $N_{RB}^{UL}-5$ | | |
| ⋮ | ⋮ | ⋮ |
| RB 4 | | |
| RB 3 | | |
| RB 2 | 1/1a/1b #1 (m=4) | 1/1a/1b #2 (m=5) |
| RB 1 | 1/1a/1b+2/2a/2b(m=2) | 1/1a/1b #0 (m=3) |
| RB 0 | 2/2a/2b #0(m=0) | 2/2a/2b #1(m=1) |
| | Slot 0 | Slot 1 |

12 subcarriers

APPARATUS AND METHOD FOR TRANSMITTING UPLINK CONTROL INFORMATION IN A MULTIPLE CARRIER SYSTEM

This application is the National Phase of PCT/KR2011/005428 filed on Jul. 22, 2011, which claims priority under 35 U.S.C. 119(e) to U.S. Provisional Application No. 61/366,918 filed on Jul. 22, 2010, all of which are hereby expressly incorporated by reference into the present application.

TECHNICAL FIELD

The present invention relates to wireless communication and, more particularly, to a method and apparatus for transmitting uplink control information in a multi-carrier system using a plurality of carriers.

BACKGROUND ART

In the case of a wide band wireless communication system, effective transmission/reception schemes and utilization schemes have been proposed in order to maximize the efficiency of limited radio resources. One of systems that are being taken into account in the next-generation wireless communication systems is a multi-carrier system. A multi-carrier system means a system for configuring a wide band by aggregating one or more carriers, each having a smaller bandwidth than a wide band, that is, a target, when a wireless communication system supports a wide band.

A conventional wireless communication system, such as 3$^{rd}$ Generation Partnership Project (3GPP) Long Term Evolution (LTE), uses carriers having various bandwidths, but the system is a single carrier system using one carrier. In contrast, the next-generation wireless communication system, such as LTE-Advanced (LTE-A), can be a multi-carrier system using an aggregation of multiple carriers, that is, a Carrier Aggregation (CA).

In a single carrier system, for example, LTE, in uplink in which a mobile station transmits a signal to a base station, a single carrier characteristic is used to efficiently utilize the power amplifier of the mobile station. A mobile station uses a control region in which control information is transmitted and a data region in which data is transmitted separately and does not send signals in the control region and the data region at the same time in order to maintain the single carrier characteristic.

In contrast, in a multi-carrier system, for example, LTE-A, simultaneous transmission in the control region and the data region may be permitted or not permitted depending on a configuration. In a multi-carrier system, a mobile station may need to send both control information and data at a specific point of time even when simultaneous transmission in the control region and the data region is not permitted. In this case, the mobile station may send the control information and the data in the data region at the same time. This is said that the control information is piggybacked (or multiplexed) and transmitted.

In a multi-carrier system, if transmission in the data region using a plurality of carriers is scheduled at a point of time at which a mobile station must send control information, there is a problem in that whether the control information must be piggybacked on the data region of what carrier and transmitted is not clear.

DISCLOSURE

Technical Problem

An object of the present invention is to provide a method and apparatus for transmitting uplink control information in a multi-carrier system.

Technical Solution

A method of sending Uplink Control Information (UCI) performed by user equipment in a multi-carrier system in accordance with an aspect of the present invention includes the steps of generating UCI for measuring a downlink component carrier (DL CC) configured in the user equipment; selecting a physical uplink shared channel (PUSCH) of one uplink component carrier according to the order of priority from PUSCHs of two or more uplink component carriers configured in the user equipment; and sending the UCI through the PUSCH of the selected uplink component carrier.

User equipment in accordance with another aspect of the present invention includes a Radio Frequency (RF) unit sending or receiving radio signals and a processor coupled with the RF unit, wherein the processor generates UCI for measuring a configured downlink component carrier (DL CC), selecting a physical uplink shared channel (PUSCH) of one uplink component carrier according to the order of priority from PUSCHs of two or more uplink component carriers configured, and sending the UCI through the PUSCH of the selected uplink component carrier.

Advantageous Effects

In accordance with the present invention, if two or more carriers are configured in UE in a multi-carrier system, uplink control information can be transmitted while lowering a probability that an error may occur.

BRIEF DESCRIPTION OF THE DRAWINGS

FIG. 6 shows a physical mapping relationship between PUCCH formats and a control region.

MODE FOR INVENTION

Technologies hereinafter may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented using radio technology, such as Universal Terrestrial Radio Access (UTRA) or CDMA2000. TDMA may be implemented using radio technology, such as Global System for Mobile communications (GSM)/General Packet Radio Service (GPRS)/Enhanced Data Rates for GSM Evolution (EDGE). OFDMA may be implemented using radio technology, such as Institute of Electrical and Electronics Engineers (IEEE) 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with systems based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using Evolved-UMTS Terrestrial Radio Access (E-UTRA), and 3GPP LTE adopts OFDMA in downlink and adopts SC-FDMA in uplink. LTE-Advanced (LTE-A) is the evolution of 3GPP LTE. In order to clarify a description, LTE and LTE-A are chiefly described, but the technical spirit of the present invention is not limited thereto.

Figure 1:
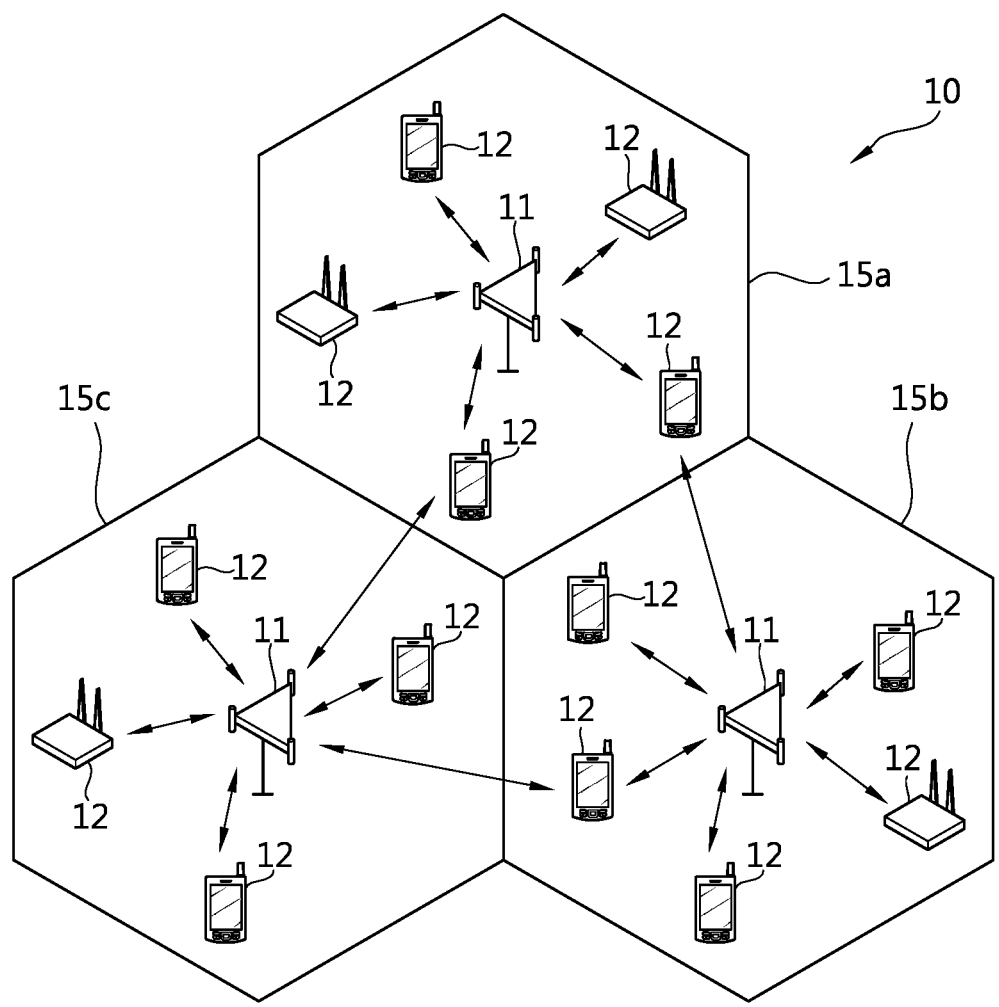
FIG. 1 shows a wireless communication system.

FIG. 1 shows a wireless communication system.

The wireless communication system 10 includes one or more Base Stations (BSs) 11. The BSs 11 provide communication services to respective geographical areas 15*a*, 15*b*, and 15*c*. User Equipment (UE) 12 may be fixed or mobile and also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device.

The BS 11 commonly refers to a fixed station communicating with the MSs 12, and the BS 11 may also be called another terminology, such as an evolved NodeB (eNB), a Base Transceiver System (BTS), or an access point.

Hereinafter, downlink refers to communication from the BS 11 to the UE 12, and uplink refers to communication from the UE 12 to the BS 11.

Figure 2:
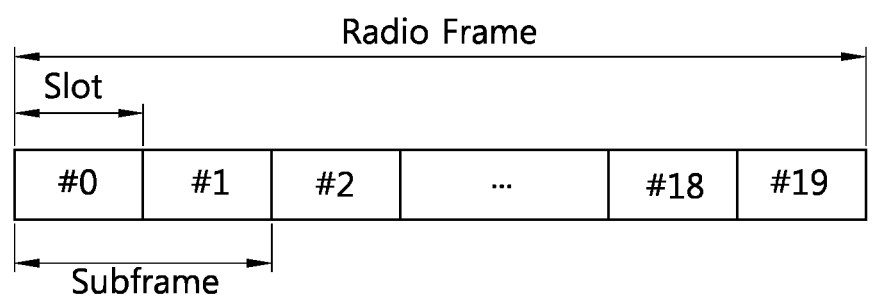
FIG. 2 shows the structure of a radio frame in 3GPP LTE.

FIG. 2 shows the structure of a radio frame in 3GPP LTE.

Referring to FIG. 2, the radio frame includes 10 subframes, and one subframe includes two slots. The slots within the radio frame are assigned slot numbers from #0 to #19. The time taken for one subframe to be transmitted is called a Transmission Time Interval (TTI). The TTI may be a scheduling unit for data transmission. For example, the length of one radio frame may be 10 ms, the length of one subframe may be 1 ms, and the length of one slot may be 0.5 ms.

One slot includes a plurality of Orthogonal Frequency Division Multiplexing (OFDM) symbols in the time domain and includes a plurality of subcarriers in the frequency domain. The OFDM symbol is for representing one symbol period because 3GPP LTE uses OFDMA in downlink and may be called another terminology. For example, if SC-FDMA is used as an uplink multi-access scheme, the OFDM symbol may be called an SC-FDMA symbol.

The structure of the radio frame is only an example. Accordingly, the number of subframes included in a radio frame, the number of slots included in a subframe, or the number of OFDM symbols included in a slot may be changed in various manners. In 3GPP LTE, one slot is defined to include 7 OFDM symbols in a normal Cyclic Prefix (CP), and one slot is defined to include 6 OFDM symbols in an extended CP.

A wireless communication system can be basically divided into a Frequency Division Duplex (FDD) method and a Time Division Duplex (TDD) method. In accordance with the FDD method, uplink transmission and downlink transmission are performed while occupying different frequency bands. In accordance with the TDD method, uplink transmission and downlink transmission are performed at different points of time while occupying the same frequency band. Channel responses in the TDD method are substantially reciprocal.

Figure 3:
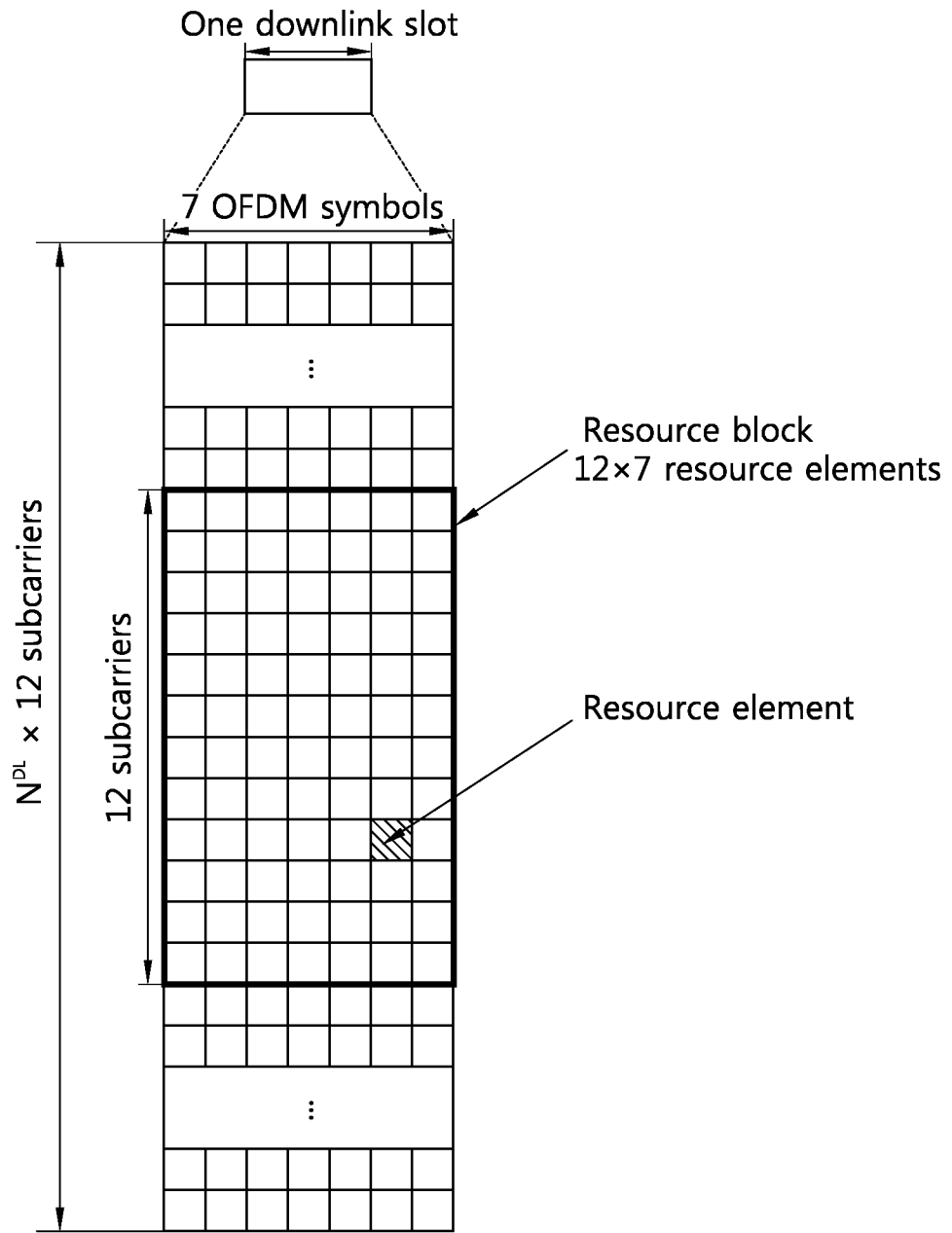
FIG. 3 shows an example of a resource grid for one downlink slot.

FIG. 3 shows an example of a resource grid for one downlink slot.

A downlink slot includes a plurality of OFDM symbols in the time domain and includes an $N_{RB}$ number of Resource Blocks (RBs) in the frequency domain. The resource block is a resource allocation unit, and the resource block includes a plurality of contiguous subcarriers in one slot. The number of resource blocks $N_{RB}$ included in a downlink slot depends on a downlink transmission bandwidth configured in a cell. For example, in an LTE system, the number of resource blocks $N_{RB}$ may be any one of 6 to 110.

Each element on the resource grid is referred to as a resource element. The resource element on the resource grid can be identified by an index pair (k,l) within a slot. Here, k (k=0, . . . , $N_{RB} \times 12-1$) is a subcarrier index within the frequency domain, and l (l=0, . . . , 6) is an OFDM symbol index within the time domain.

Here, one resource block is illustrated as including 7×12 resource elements, including 7 OFDM symbols in the time domain and 12 subcarriers in the frequency domain, but the number of OFDM symbols and the number of subcarriers within the resource block are not limited thereto. The number of OFDM symbols and the number of subcarriers may be changed in various manners depending on the length of a CP, frequency spacing, etc. For example, in the case of a normal CP, the number of OFDM symbols is 7, and in the case of an extended CP, the number of OFDM symbols is 6. In one OFDM symbol, one of 128, 256, 512, 1024; 1536, and 2048 may be selected and used as the number of subcarriers. The structure of an uplink slot may be the same as that of the downlink slot.

Figure 4:
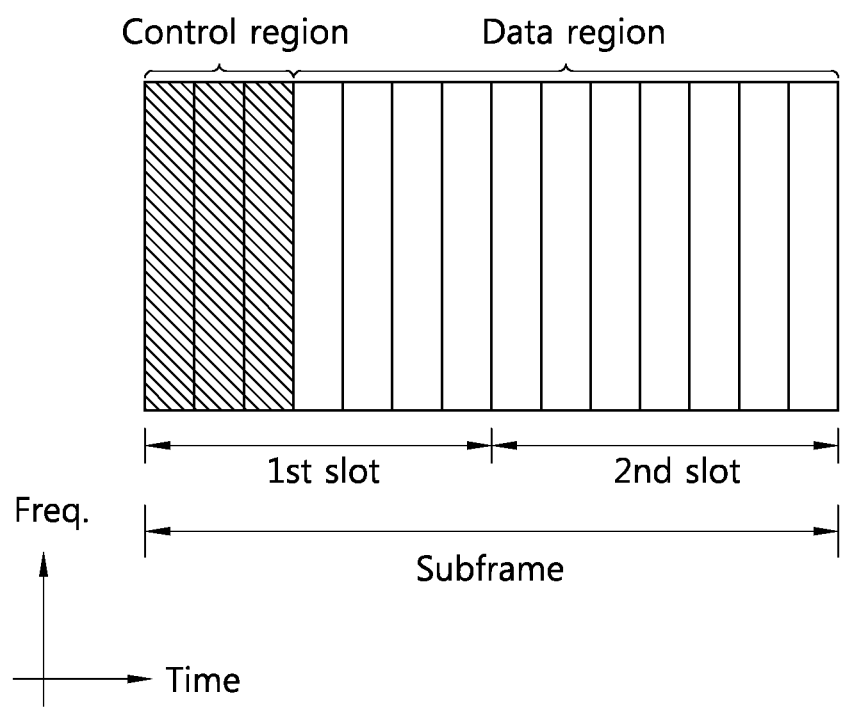
FIG. 4 shows the structure of a downlink subframe.

FIG. 4 shows the structure of a downlink subframe.

A downlink subframe includes 2 slots in the time domain, and each slot includes 7 OFDM symbols in a normal CP. A maximum of former 3 OFDM symbols (a maximum of 4 OFDM symbols in relation to a 1.4 MHz bandwidth) in the first slot within the downlink subframe become a control region to which control channels are allocated, and the remaining OFDM symbols become a data region to which physical downlink shared channels (PDCCHs) are allocated.

A physical downlink control channel (PDCCH) can carry the resource allocation and transport format of a downlink-shared channel (DL-SCH), information on the allocation of resources on an uplink shared channel (UL-SCH), paging information on a PCH, system information on a DL-SCH, and the resource allocation of a higher layer control message such as a random access response transmitted on a PDSCH, a set of transmission power control commands for individual UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of some contiguous CCEs. A CCE is a logical allocation unit used to provide a PDCCH with a coding rate according to the state of a radio channel. A CCE corresponds to a plurality of resource element groups. The format of the PDCCH and the number of possible bits of the PDCCH are determined by a correlation between the number of CCEs and a coding rate provided by the CCEs.

A BS determines a PDCCH format based on DCI that will be transmitted to UE and attaches a Cyclic Redundancy Check (CRC) to control information. A unique identifier (i.e., a Radio Network Temporary Identifier (RNTI)) is masked to the CRC depending on the owner or use of a PDCCH. If the PDCCH is for specific UE, an identifier unique to the UE, for example, a Cell-RNTI (C-RNTI) can be masked to the CRC. Or, if the PDCCH is for a paging message, a paging indication identifier, that is, a Paging-RNTI (P-RNTI), can be masked to the CRC. If the PDCCH is for a System Information Block (SIB), a system information identifier, that is, a System Information-RNTI (SI-RNTI), can be masked to the CRC. A Random Access-RNTI (RA-RNTI) can be masked to the CRC in order to indicate a random access response, that is, a response to the transmission of the random access response of UE.

Figure 5:
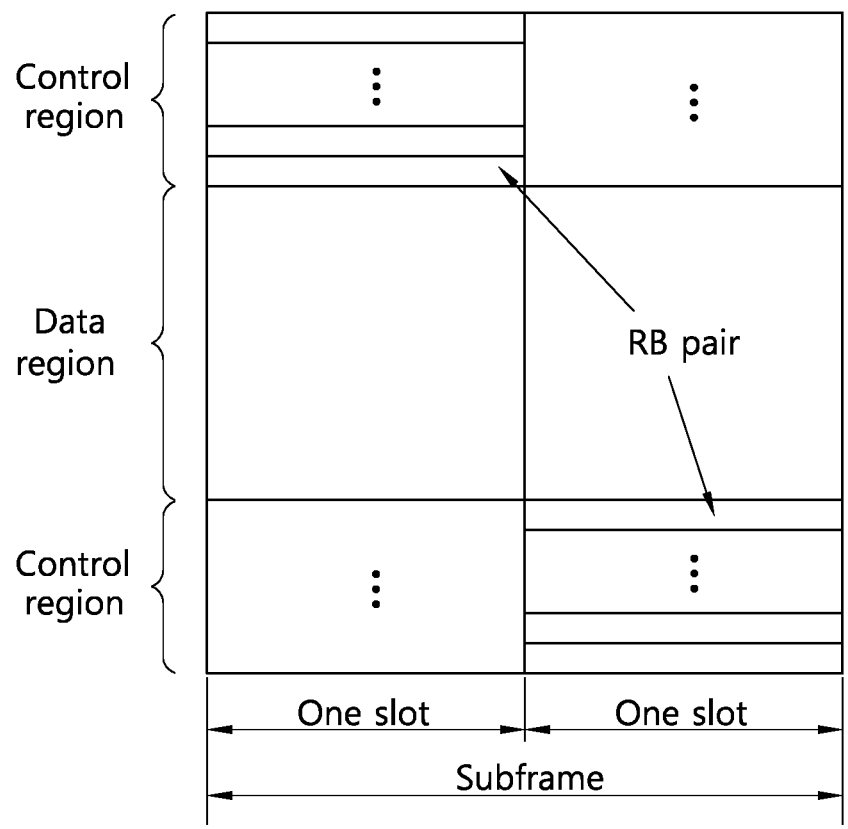
FIG. 5 shows the structure of an uplink subframe.

FIG. 5 shows the structure of an uplink subframe.

An uplink subframe can be divided into a control region and a data region in the frequency domain. A physical uplink control channel (PUCCH) on which Uplink Control Information (UCI) is transmitted is allocated to the control region. A physical uplink shared channel (PUSCH) on which uplink data and/or UCI is transmitted is allocated to the data region. In this sense, the control region may be called a PUCCH region, and the data region may be called a PUSCH region. UE may support the simultaneous transmission of a PUSCH and a PUCCH or may do not support the simultaneous transmission of a PUSCH and a PUCCH depending on configuration information indicated by a higher layer.

A PUSCH is mapped to an uplink shared channel (UL-SCH), that is, a transport channel. Uplink data transmitted on the PUSCH may be a transport block, that is, a data block for an UL-SCH transmitted during a TTI. The transport block may be user information. Or, the uplink data may be multiplexed data. The multiplexed data can be obtained by multiplexing a transport block for an UL-SCH and UCI. For example, the UCI multiplexed into uplink data may include a Channel Quality Indicator (CQI), a Precoding Matrix Indicator (PMI), Hybrid Automatic Repeat Request (HARQ) acknowledgement/non-acknowledgement (ACK/NACK), a Rank Indicator (RI), etc. The transmission of UCI, together with uplink data, in the data region as described above is called the piggyback transmission of the UCI. The piggyback transmission is described in detail later. Only UCI may be transmitted in the PUSCH.

A PUCCH for one MS is allocated in the form of a resource block pair (RB pair) in a subframe. Resource blocks belonging to the RB pair occupy different subcarriers in a first slot and a second slot. A frequency occupied by resource blocks that belong to an RB pair allocated to a PUCCH is changed on the basis of a slot boundary. This is said that the RB pair allocated to the PUCCH has been frequency-hopped at the slot boundary. A frequency diversity gain can be obtained when UE sends UCI through different subcarriers over time.

A PUCCH carries a variety of pieces of control information depending on formats. A PUCCH format 1 carries a Scheduling Request (SR). Here, an On-Off Keying (OOK) scheme may be used. A PUCCH format 1a carries acknowledgement/non-acknowledgement (ACK/NACK) modulated according to a Binary Phase Shift Keying (BPSK) scheme in relation to one codeword. A PUCCH format 1b carries ACK/NACK modulated according to a Quadrature Phase Shift Keying (QPSK) scheme in relation to two codewords. A PUCCH format 2 carries a Channel Quality Indicator (CQI) modulated according to a QPSK scheme. PUCCH formats 2a and 2b carry a CQI and ACK/NACK. A PUCCH format 3 is modulated according to a QPSK scheme, and the PUCCH format 3 can carry a plurality of ACK/NACKs and an SR.

Table 1 shows modulation schemes according to the PUCCH formats and the number of bits within a subframe.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

FIG. 6 shows a physical mapping relationship between the PUCCH formats and a control region.

Referring to FIG. 6, the PUCCH formats 2/2a/2b are mapped to resource blocks (e.g., m=0, 1 in a PUCCH region) at the edge of a band and then transmitted. A mixed PUCCH resource block can be mapped to a resource block (e.g., m=2) adjacent to the direction of the center of a band in a resource block to which the PUCCH formats 2/2a/2b is allocated and then transmitted. The PUCCH formats 1/1a/1b in which an SR and ACK/NACK are transmitted can be disposed in a resource block, that is, m=4 or m=5. The number of resource blocks $N^{(2)}_{RB}$ that may be used in the PUCCH formats 2/2a/2b in which a CQI is transmitted can be indicated to UE through a broadcast signal.

Figure 7:
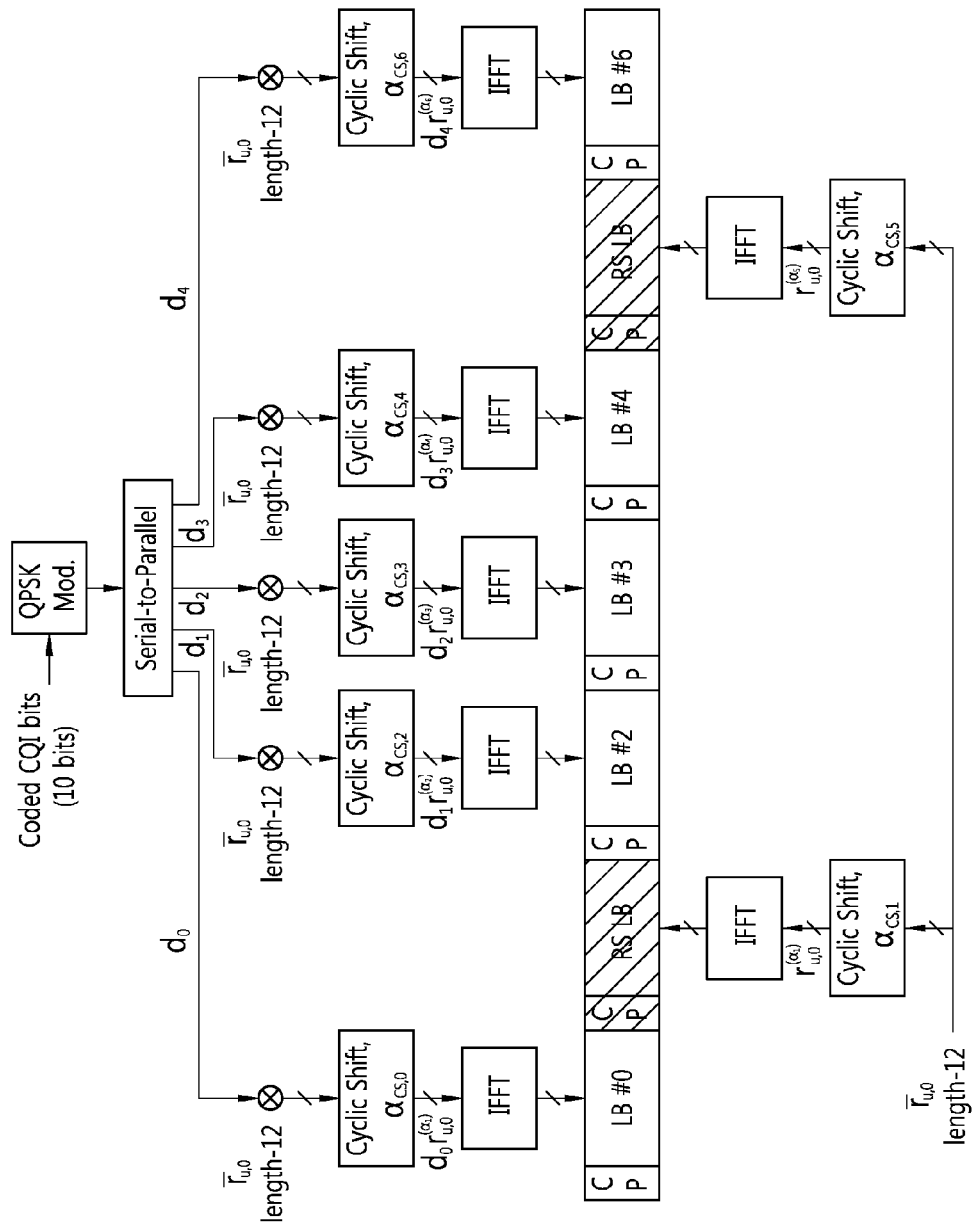
FIG. 7 shows the structure of the channels of PUCCH formats 2/2a/2b for one slot in a normal CP. The PUCCH formats 2/2a/2b are used to send a CQI.

FIG. 7 shows the structure of the channels of the PUCCH formats 2/2a/2b for one slot in a normal CP. The PUCCH formats 2/2a/2b are used to send a CQI.

Referring to FIG. 7, in a normal CP, SC-FDMA symbols 1 and 5 are used for a demodulation reference symbol (DM RS), that is, an uplink reference signal. In the case of an extended CP, an SC-FDMA symbol 3 is used for a DM RS.

10 CQI bits are subject to channel coding, for example, in a ratio of 1/2, thus becoming 20 coded bits. A Reed-Muller code may be used in the channel coding. Next, the 20 coded bits are scrambled (like that PUSCH data are scrambled in a Gold sequence having a length 31) and then subject to QPSK constellation mapping, thereby generating QPSK modulation symbols ($d_0$ to $d_4$ in a slot 0). Each QPSK modulation symbol is modulated in a cyclic shift of a base RS sequence, that is, a length 12, subject to OFDM modulation, and is then transmitted in 10 SC-FDMA symbols within a subframe, respectively. 12 cyclic shifts that are uniformly spaced apart from one another enable 12 different MSs to be orthogonally multiplexed in the same PUCCH resource block. A base RS sequence, that is, a length 12, can be used as a DM RS sequence applied to SC-FDMA symbols 1 and 5.

Figure 8:
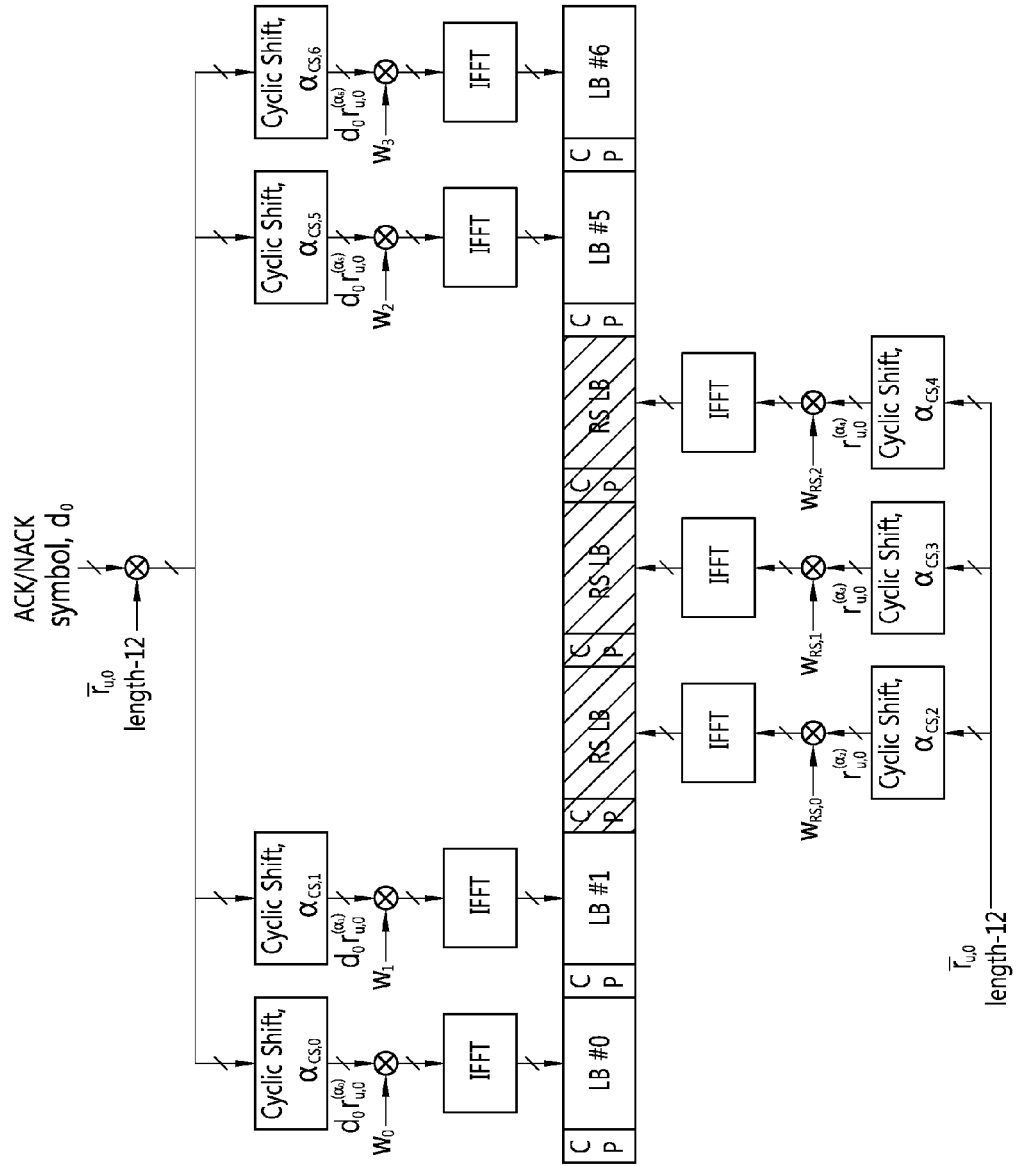
FIG. 8 shows PUCCH formats 1a/1b for one slot in a normal CP.

FIG. 8 shows the PUCCH formats 1a/1b for one slot in a normal CP. An uplink reference signal is transmitted in third to fifth SC-FDMA symbols. In FIG. 8, $w_0$, $w_1$, $w_2$, and $w_3$ may be subject to Inverse Fast Fourier Transform (IFFT) modulation and then modulated in the time domain, or $w_0$, $w_1$, $w_2$, and $w_3$ may be modulated in the frequency domain prior to IFFT modulation.

In LTE, ACK/NACK and a CQI may be transmitted in the same subframe at the same time or may not be transmitted at the same time. If the simultaneous transmission of ACK/

NACK and a CQI is not possible, UE may need to send the ACK/NACK in the PUCCH of a subframe in which CQI feedback has been configured. In this case, the CQI is dropped, and only the ACK/NACK is transmitted through the PUCCH formats 1a/1b.

The simultaneous transmission of the ACK/NACK and the CQI in the same subframe may be possible through UE-specific higher layer signaling. If the simultaneous transmission is possible, the CQI and 1-bit or 2-bit ACK/NACK information can be multiplexed into the same PUCCH resource block in a subframe that a BS scheduler has permitted the simultaneous transmission of the CQI and the ACK/NACK.

If UE has to send UCI in a subframe to which resources have been allocated for PUSCH transmission, the UCI can be multiplexed along with uplink data.

Figure 9:
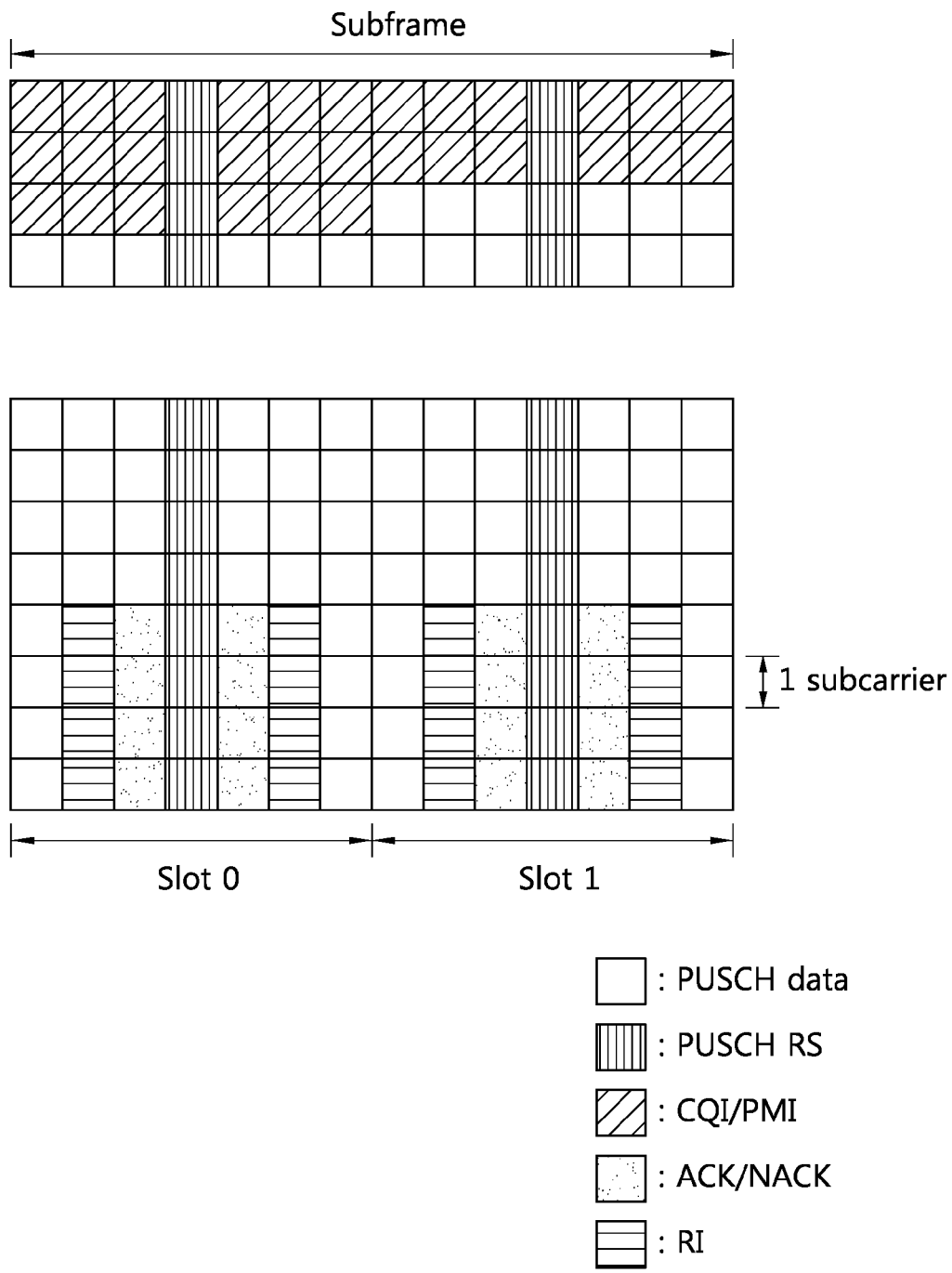
FIG. 9 shows an example of the multiplexing of uplink data and UCI on a PUSCH.

FIG. 9 shows an example of the multiplexing of uplink data and UCI on a PUSCH.

Referring to FIG. 9, in the PUSCH region of a subframe, a PUSCH Reference Signal (RS) is allocated to one symbol in a first slot or second slot. The PUSCH RS is a reference signal used to demodulate data and control information which are transmitted in the PUSCH region. FIG. 9 shows an example in which the PUSCH RS is allocated to the fourth symbol of a first slot and a second slot. Here, a specific type of control information, for example, a CQI/PMI may be allocated to symbols from the first symbol of a subframe to the last symbol in relation to one subcarrier and then allocated to a next subcarrier. That is, the CQI/PMI may be allocated to symbols from the first symbol of the subframe to the last symbol other than symbols to which the PUSCH RS is allocated. The CQI/PMI may have the same modulation order as a modulation order used in PUSCH data. A (32,k) block code is used in a CQI/PMI report up to 11 bits, and a CRC is not attached thereto. An 8-bit CRC is attached to a CQI/PMI report greater than 11 bits, and channel coding and rate matching are performed on the CQI/PMI report greater than 11 bits using a tail-biting convolution code.

Another type of the control information, for example, ACK/NACK may be allocated to symbols neighboring symbols to which the PUSCH RS is allocated. The number of symbols to which ACK/NACK can be allocated may be a maximum of 4. If this allocation method is used, ACK/NACK can use the best channel estimation results. ACK/NACK can be allocated to symbols neighboring symbols to which a PUSCH RS is allocated after puncturing data, that is, PUSCH data.

An RI may be allocated to symbols neighboring symbols to which ACK/NACK can be allocated.

As described above, Uplink Control Information (UCI) can be piggybacked on a PUSCH and transmitted.

From among pieces of UCI, two types of CQI feedbacks can be supported. That is, a periodic CQI feedback and an aperiodic CQI feedback can be supported in the time domain. The periodic CQI feedback uses a PUCCH, and the aperiodic CQI feedback uses a PUSCH. The frequency granularity of the CQI feedback is defined as the number of subbands N that include k contiguous resource blocks. k may be determined by the type of CQI feedback. The number of subbands N may be given as in the following equation.

$$N=\lceil N_{RB}^{DL}/k \rceil \quad \text{[Equation 1]}$$

In Equation 1, $N^{DL}_{RB}$ is the number of resource blocks across a system band.

An aperiodic CQI feedback on a PUSCH can be scheduled when a BS sends an UL grant, including a CQI request bit, on a PDCCH. The type of CQI feedback can be set by a BS through an RRC signal. The type of CQI feedback includes 1. a broadband CQI feedback, 2. an eNB-configured subband feedback, and 3. a UE-selective subband feedback.

UE reports one CQI value for the entire system band through the broadband CQI feedback.

UE reports a broadband CQI value for the entire system band and further reports a CQI value for each subband, through the eNB-configured subband feedback. The size k of a subband is a function of a system band and is given as in the following table.

TABLE 2

| System bandwidth (RBs) | Sub-band size (k RBs) |
|---|---|
| 6-7 | (Wideband CQI only) |
| 8-10 | 4 |
| 11-26 | 4 |
| 27-63 | 6 |
| 64-110 | 8 |

In the UE-selective subband feedback, UE estimates the channel quality of each subband, selects M subbands of good quality each having a size k, and feeds back one broadband CQI and a mean CQI value for a plurality of the selected subband. k and M are given as in the following table.

TABLE 3

| System bandwidth (RBs) | Sub-band size (k RBs) | Number of preferred sub-bands (M) |
|---|---|---|
| 6-7 | (Wideband CQI only) | (Wideband CQI only) |
| 8-10 | 2 | 1 |
| 11-26 | 2 | 3 |
| 27-63 | 3 | 5 |
| 64-110 | 4 | 6 |

UE sends a periodic CQI through a PUCCH. The type of periodic CQI feedback includes a broadband CQI feedback and a UE-selective subband feedback. Like in the aperiodic CQI feedback, a BS can set the type of periodic CQI through RRC signaling. In the broadband CQI feedback, a report cycle can be set to {2, 5, 10, 16, 20, 32, 40, 64, 80, 160}[ms] or 'off (FDD)'. In the UE-selective subband feedback, N subbands are divided into J parts (they are called band parts). The value of J is dependent on a system band and may be given as in the following table.

TABLE 4

| System bandwidth (RBs) | Sub-band size (k RBs) | Number of bandwidth parts (J) |
|---|---|---|
| 6-7 | (Wideband CQI only) | 1 |
| 8-10 | 4 | 1 |
| 11-26 | 4 | 2 |
| 27-63 | 6 | 3 |
| 64-110 | 8 | 4 |

In the UE-selective subband feedback, one CQI value is calculated and one subband selected from each band part is fed back.

A multi-carrier system is described below.

Figure 10:
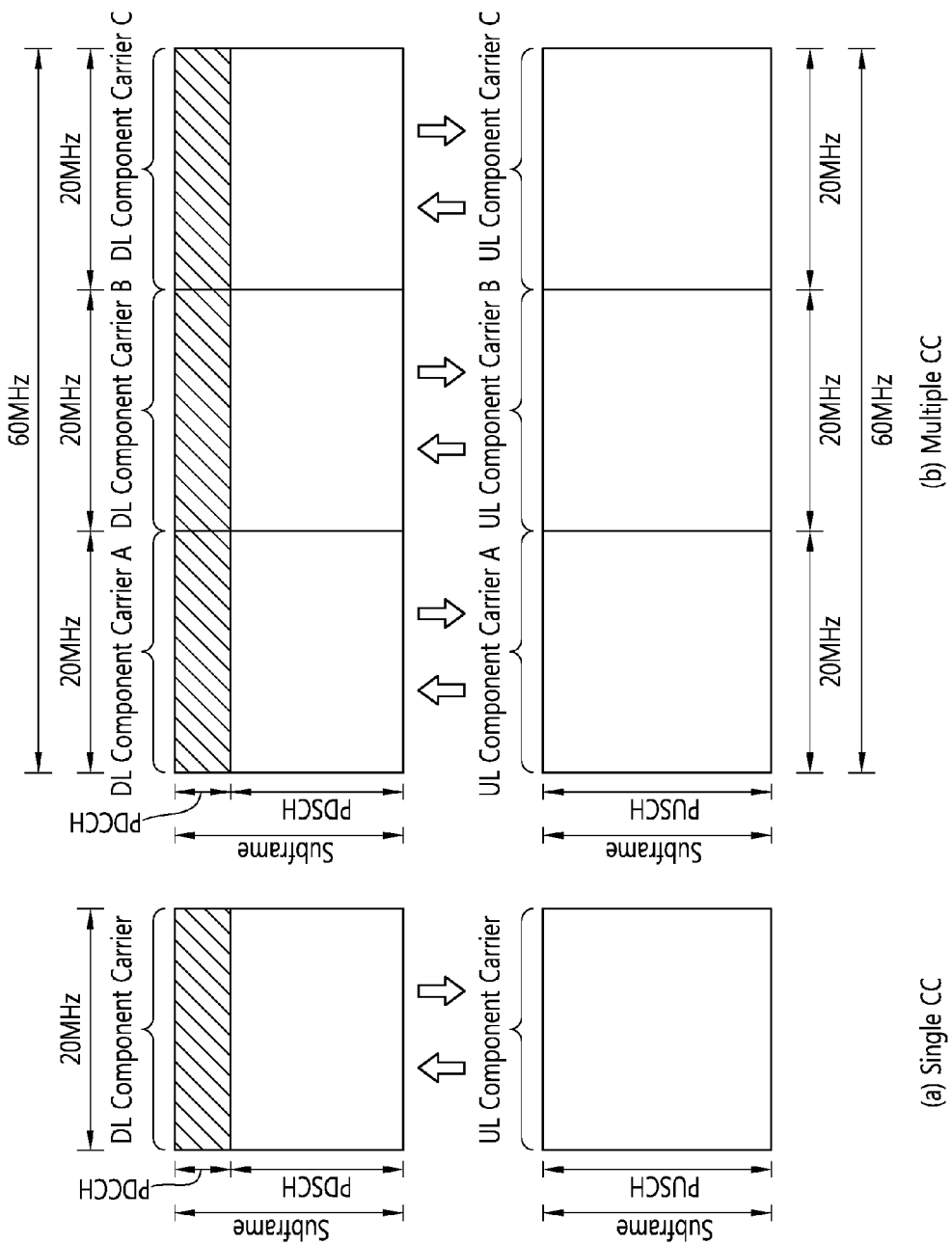
FIG. 10 is an example of a comparison between a single carrier system and a multi-carrier system.

FIG. 10 is an example of a comparison between a single carrier system and a multi-carrier system.

Referring to FIG. 10, in a single carrier system, only one carrier is supported for UE in uplink and downlink. A carrier may have a variety of bandwidths, but only one carrier is allocated to UE. In contrast, in a Carrier Aggregation (CA) system, a plurality of component carriers DL CCs A to C and UL CCs A to C can be allocated to UE. For example, in order to allocate a bandwidth of 60 MHz to UE, three component carriers each having 20 MHz may be allocated to the UE.

A multi-carrier system may be divided into a contiguous multi-carrier system in which carriers are contiguous to each other and a non-contiguous multi-carrier system in which carriers are spaced apart from each other. When a multi-carrier system is simply described hereinafter, it should be understood that the multi-carrier system includes both a case where component carriers are contiguous to each other and a case where component carriers are not contiguous to each other.

Component carriers, that is, targets, when aggregating one or more component carriers may use a bandwidth used in the existing system for the purpose of backward compatibility with the existing system. For example, a 3GPP LTE system may support bandwidths of 1.4 MHz, 3 MHz, 5 MHz, 10 MHz, 15 MHz, and 20 MHz, and a 3GPP LTE-A system may configure broadbands of 20 MHz or higher using only the bandwidths of the 3GPP LTE system. Or, a broadband may be configured by defining a new bandwidth without using the bandwidths of the existing system.

The system frequency band of a wireless communication system is classified into a plurality of carrier frequencies. Here, the carrier frequency means the center frequency of a cell. Hereafter, a cell may mean downlink frequency resources and uplink frequency resources. Or, a cell may mean a combination of downlink frequency resources and optional uplink frequency resources. Furthermore, in general, when a Carrier Aggregation (CA) is not taken into consideration, uplink and downlink frequency resources may be always presented in pairs in one cell.

In order for data to be transmitted and received through a specific cell, UE has to first complete a configuration for the specific cell. Here, the configuration means a state in which the reception of system information necessary to transmit and receive the data for the specific cell has been completed. For example, the configuration may include an overall process of receiving common physical layer parameters necessary to transmit and receive data, MAC layer parameters, or parameters necessary for a specific operation in an RRC layer. A configuration-complete cell becomes a state in which the cell can transmit and receive data immediately when the cell receives only information on which the data can be transmitted.

A cell of a configuration-complete state may be present in an activation or deactivation state. Here, activation refers to a state in which transmission or reception is being performed or a state in which transmission or reception is ready. UE can monitor or receive the control channel (PDCCH) and the data channel (PDSCH) of an activated cell in order to check resources allocated thereto (e.g., a frequency and time).

Deactivation means that the transmission or reception of traffic data is impossible and that measurement or the transmission/reception of minimum information is possible. UE can receive necessary System Information (SI) in order to receive a packet from a deactivated cell. In contrast, UE does not monitor or receive the control channel (PDCCH) and the data channel (PDSCH) of a deactivated cell in order to check resources allocated thereto (e.g., a frequency and time).

A cell may be divided into a primary cell and a secondary cell (or a serving cell).

The primary cell means a cell that operates in a primary frequency, a cell through which UE performs an initial connection establishment procedure or a connection re-establishment process with a BS, or a cell indicated as a primary cell in a handover process.

The secondary cell means a cell that operates in a secondary frequency. Once RRC connection is set up, the secondary cell is used to provide additional radio resources.

A serving cell is configured as a primary cell in the case of UE in which a CA has not been configured or UE to which a CA cannot be provided. If a CA is configured, the term 'serving cell' is used to indicate a primary cell, one or a set of a plurality of cells among all secondary cells.

That is, a primary cell means one serving cell that provides a security input and NAS mobility information in an RRC establishment or re-establishment state. At least one cell, together with a primary cell, may form a set of serving cells depending on the capabilities of UE. Here, at least one cell is called a secondary cell.

Accordingly, a set of serving cells configured for one MS may include only one primary cell or may include one primary cell and at least one secondary cell.

A Primary Component Carrier (PCC) means a CC corresponding to a primary cell. The PCC is a CC through which UE sets up connection or RRC connection with a BS at the early stage, from among some CCs. The PCC is a CC that is responsible for connection or RRC connection for signaling regarding a plurality of CCs and that manages UE context, that is, connection information related to UE. Furthermore, the PCC is always present in an activation state when it is connected with UE and thus in RRC connected mode. A downlink component carrier corresponding to a primary cell is referred to as a downlink primary component carrier (DL PCC), and an uplink component carrier corresponding to a primary cell is referred to as an UL PCC.

A Secondary Component Carrier (SCC) means a CC corresponding to a secondary cell. That is, the SCC is a CC allocated to UE in addition to a PCC. The SCC is a carrier that has been extended for additional resource allocation by UE in addition to a PCC and may be divided into activation and deactivation states.

A primary cell and a secondary cell have the following characteristics.

First, the primary cell is used to send a PUCCH. Second, the primary cell is always activated, whereas the secondary cell is a carrier that is activated or deactivated depending on a specific condition. Third, when the primary cell experiences a Radio Link Failure (hereinafter referred to as an RLF), RRC re-establishment is triggered. When the secondary cell experiences an RLF, RRC re-establishment is not triggered. Fourth, the primary cell can be changed by a change of a security key or a handover procedure that is accompanied by a Random Access Channel (RACH) procedure. Fifth, Non-Access Stratum (NAS) information is received through the primary cell. Sixth, in the primary cell, a DL PCC and an UL PCC are always configured in pair. Seventh, a different Component Carrier (CC) can be configured as a primary cell for each UE. Eighth, procedures, such as the reconfiguration, addition, and removal of a primary cell, can be performed by an RRC layer. In adding a new secondary cell, RRC signaling may be used to send system information on a dedicated secondary cell.

In relation to a component carrier that forms a serving cell, a downlink component carrier may form one serving cell, and a downlink component carrier and an uplink component carrier may be linked to form one serving cell. However, only one uplink component carrier does not form a serving cell.

The activation/deactivation of a component carrier is equal to the activation/deactivation of a serving cell. For example, assuming that a serving cell1 is composed of a DL CC1, the activation of the serving cell1 means the activation of the DL CC1. Assuming that a DL CC2 and an UL CC2 have been subject to connection established in a serving cell2, the activation of the serving cell2 means the activation of the DL CC2 and the UL CC2. In this sense, each component carrier can correspond to a cell.

A multi-carrier system can support cross-carrier scheduling. The term 'cross-carrier scheduling' is a scheduling method of allocating the resource of a PDSCH transmitted through other component carriers through a PDCCH that is transmitted through a specific component carrier and/or the resource of a PUSCH transmitted through other component carriers other than component carriers that are basically linked to a specific component carrier. That is, a PDCCH and a PDSCH may be transmitted through different DL CCs, and a PUSCH may be transmitted through another UL CC other than an UL CC that is basically linked to a DL CC in which a PDCCH including an UL grant is transmitted. As described above, a system supporting cross-carrier scheduling requires a carrier indicator, informing that a PDSCH/PUSCH provided with control information from a PDCCH are transmitted through what DL CC/UL CC. A field including this carrier indicator is called a Carrier Indicator Field (CIF). A BS can set the existence or non-existence of a CIF through a higher layer signal, such as RRC, semi-statically or in a UE-specific manner. If a CIF is set not to exist, cross-carrier scheduling is not performed and is scheduled like in the existing single carrier. If a CIF is set to exist, the above-described cross-carrier scheduling may be performed.

Figure 11:
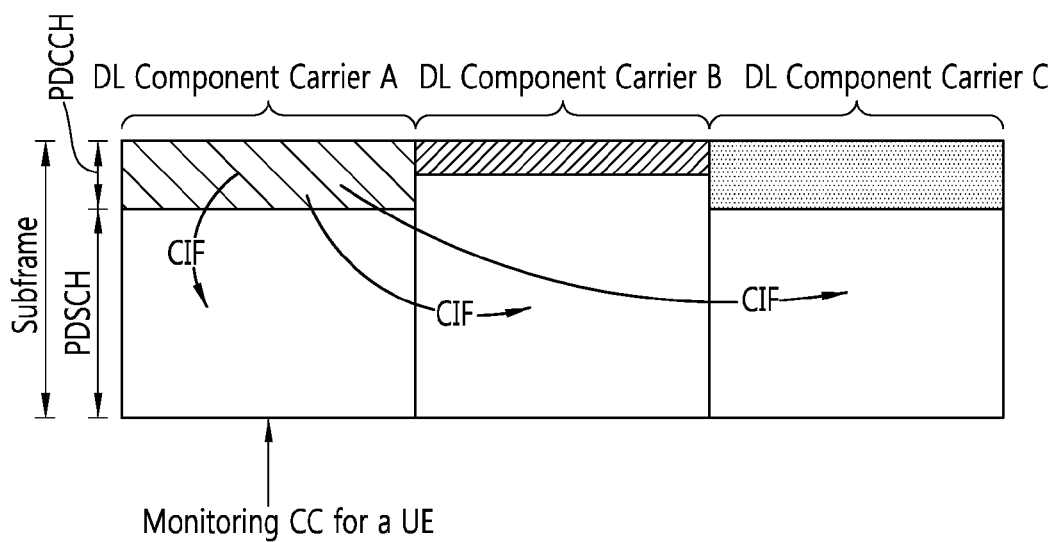
FIG. 11 shows an example of the structure of a subframe for cross-carrier scheduling.

FIG. 11 shows an example of the structure of a subframe for cross-carrier scheduling.

Referring to FIG. 11, three downlink component carriers, that is, a DL CC A, a DL CC B, and a DL CC C, are configured in UE. From among them, the DL CC A is a monitoring DL CC through which the UE monitors a PDCCH. The UE receives Downlink Control Information (DCI) on the DL CC A, the DL CC B, and the DL CC C in the PDCCH of the DL CC A. The UE can identify that DCI is about what DL CC because a CIF is included in the DCI. The monitoring DL CC may be a DL PCC. The monitoring DL CC may be configured in a UE-specific manner or in a UE group-specific manner.

Figure 12:
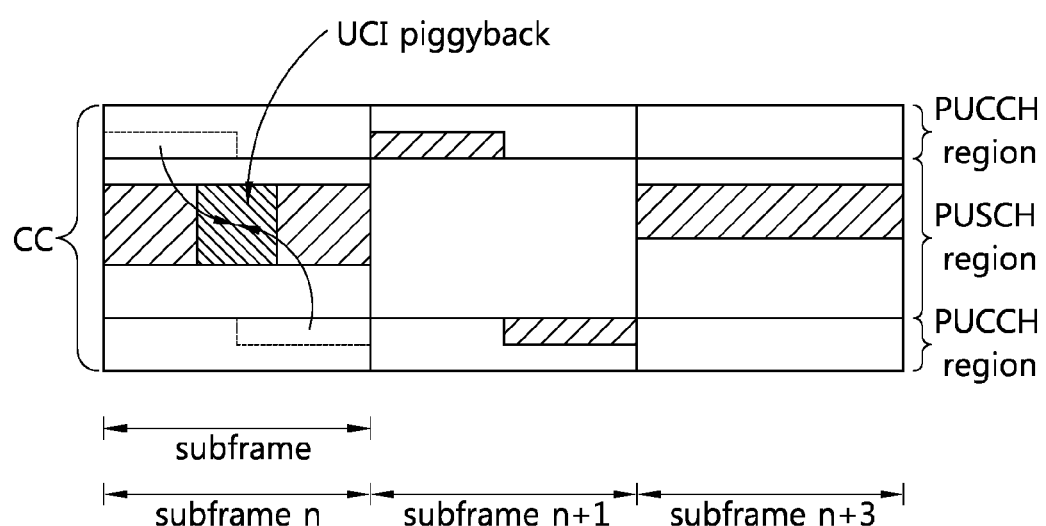
FIG. 12 shows an example in which UCI is piggybacked on a PUSCH0-∥ and transmitted in a single carrier system.

FIG. 12 shows an example in which UCI is piggybacked on a PUSCH and transmitted in a single carrier system.

Referring to FIG. 12, if a PUCCH and a PUSCH are requested to be transmitted in the same subframe, UE multiplexes UCI into the PUSCH and sends them. The multiplexing and transmission of the UCI and the PUSCH as described above is called piggyback transmission. The reason why UCI is piggybacked and transmitted as described above is to maintain the transmission of a single carrier having a good Peak-to-Average Power Ratio (PAPR) characteristic or a good Cubic Metric (CM) characteristic in order to maintain the performance and efficient utilization of the power amplifier of UE. In a single carrier system, in the case of PUSCH transmission, data to be transmitted maintains a single carrier characteristic through DFT precoding. In the case of PUCCH transmission, information is carried and transmitted on a sequence having a single carrier characteristic in order to maintain the single carrier characteristic. If DFT-precoded data is discontinuously allocated in the frequency domain or a PUSCH and a PUCCH are simultaneously transmitted, however, this single carrier characteristic is broken. Accordingly, if a PUCCH and a PUSCH are requested to be transmitted in the same subframe, UCI is multiplexed into the PUSCH and transmitted as in FIG. 12.

Meanwhile, in a multi-carrier system, such as LTE-A, a plurality of UL CCs may be configured in UE, and a plurality of PUSCHs may be transmitted through the plurality of UL CCs in one subframe. In contrast, to send a PUCCH through only a specific one of the plurality of UL CCs is taken into consideration. Accordingly, the simultaneous transmission of one or more PUSCHs and PUCCHs in a specific subframe may be requested. In this case, the single carrier characteristic is broken. This problem can be solved when UE operating in an LTE-A system uses a power amplifier having a good characteristic. Even this UE may encounter an insufficient power problem according to circumstances (e.g., when the UE is placed at a cell boundary) and thus has to send UCI with a single carrier characteristic. To this end, one of two transmission methods, such as those shown in FIG. 13, may be selected according to the uplink condition of the UE.

Figure 13:
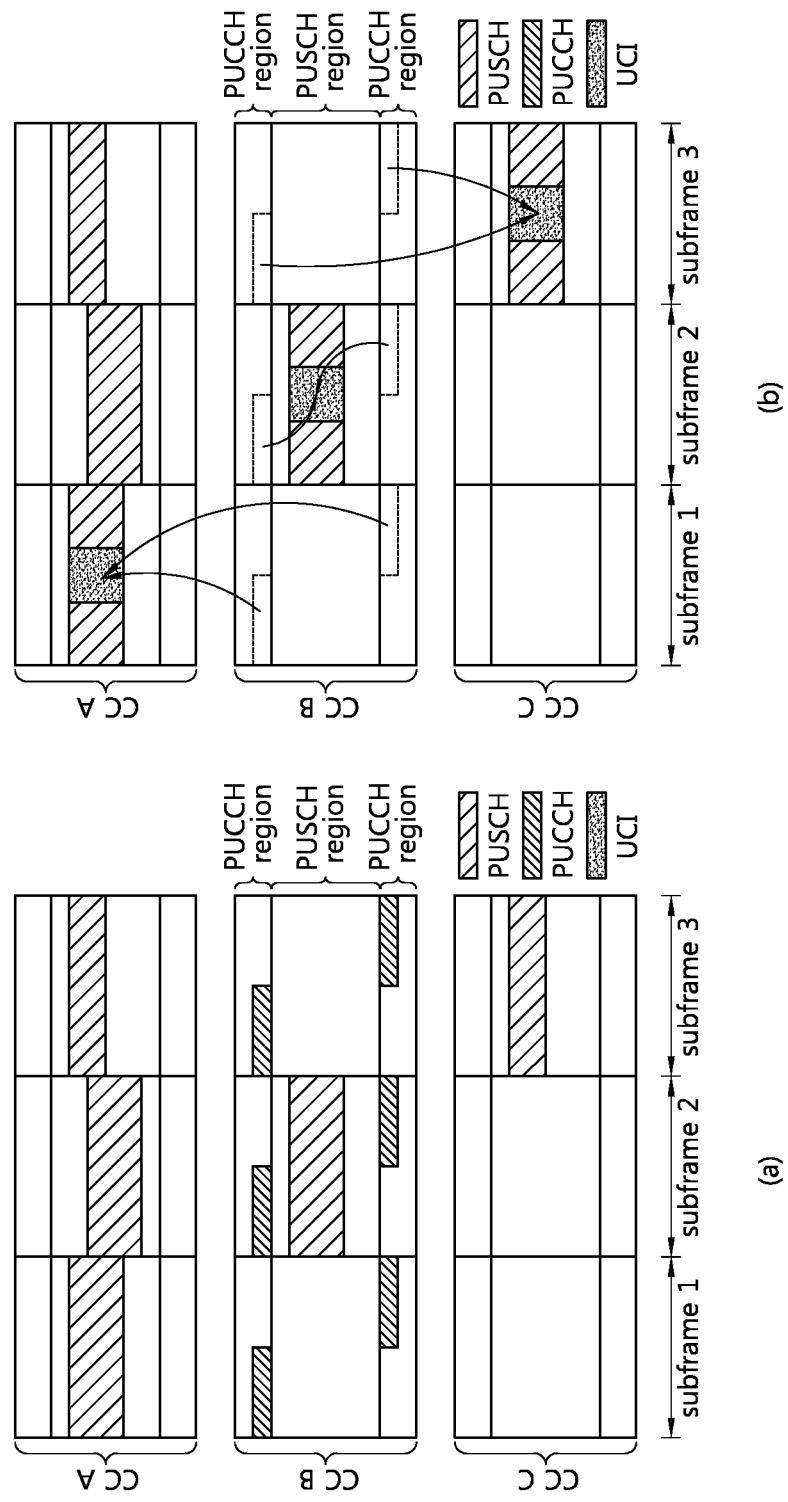
FIG. 13 shows an example of a method of UE sending UCI in uplink in a multi-carrier system.

FIG. 13 shows an example of a method of UE sending UCI in a multi-carrier system.

Referring to FIG. 13(a), the UE has a plurality of UL CCs configured therein, and the simultaneous transmission of a PUCCH and a PUSCH in the same subframe is possible. Referring to FIG. 13(b), if the simultaneous transmission of a PUCCH and a PUSCH in the same subframe is requested, the UE piggybacks UCI to an UL CC in which the PUSCH is transmitted and sends the UCI. For example, UCI reserved for transmission in a DL CC B may be piggybacked and transmitted on a DL CC A in a subframe 1, piggybacked and transmitted on the DL CC B in a subframe 2, and piggybacked and transmitted on the PUSCH of a DL CC C in a subframe 3.

As described above, unlike a single carrier system, a multi-carrier system can support a plurality of serving cells, that is, a plurality of Component Carriers (CCs). Accordingly, UE can send uplink control information through one of the plurality of UL CCs, for example, the PUCCH of an UL PCC. In a multi-carrier system, however, the simultaneous transmission of a PUCCH and a PUSCH may be configured in UE, or the simultaneous transmission of a PUCCH and a PUSCH may not be configured in the UE.

If the simultaneous transmission of the PUCCH and the PUSCH is not configured, the UE piggybacks uplink control information to the PUSCH and sends the uplink control information if there is PUSCH transmission in a subframe in which the uplink control information has to be transmitted. In a subframe in which uplink control information has to be transmitted in the time domain, if there is PUSCH transmission in a plurality of carriers in the frequency domain, whether the uplink control information will be piggybacked on or multiplexed into the PUSCH of what carrier is problematic. Methods of UE sending UCI in a multi-carrier system in accordance with the present invention is described below.

As described above, in a single carrier system, such as LTE, there are two types of CSI: an aperiodic CSI and a periodic CSI. The aperiodic CSI is CSI triggered by the CSI request bit of an UL grant and aperiodically transmitted through a PUSCH. The periodic CSI is CSI configured by an RRC signal and periodically transmitted through a PUCCH. The CSI includes a CQI, a PMI, an RI, a PTI, etc. Furthermore, UCI includes an ACK/NACK response to a downlink data channel in addition to the CSI.

A single carrier system has a structure in which UE sends and receives a control signal and data through one DL CC/UL CC pair. Accordingly, in the transmission of an aperiodic CSI and a periodic CSI, a DL CC, that is, the subject of CSI measurement (called CSI DL CC for the sake of convenience), is identical. In general, if a PUSCH has to be transmitted in a subframe in which a periodic CSI has been reserved for transmission, the periodic CSI is multiplexed with uplink data and piggybacked and transmitted through the PUSCH not a PUCCH.

If an aperiodic CSI has to be transmitted through a PUSCH in a subframe in which a periodic CSI has been reserved for transmission, the periodic CSI is dropped. This is because the aperiodic CSI and the periodic CSI are pieces of CSI for the same DL CC and the aperiodic CSI can provide finer channel status information than the periodic CSI.

A multi-carrier system, such as LTE-A, has a structure in which one MS can transmit and receive a control signal and data through a plurality of DL CCs/UL CCs. Furthermore, one DL CC can schedule one DL CC/UL CC or two or more DL CCs/UL CCs through cross-carrier scheduling. To this end, UE has to be able to send a periodic CSI on the plurality of DL CCs. Furthermore, the UE may have to be able to send an aperiodic CSI on the plurality of DL CCs, such as a DL CC in which an UL grant is transmitted, a DL CC according to the value of a CIF included in the UL grant, or a DL CC according to a predetermined rule. Furthermore, if data channels are received through a plurality of DL CCs, UE may have to be able to send ACK/NACK for each of the data channels. Pieces of UCI increased as described above may need to be piggybacked and transmitted on a PUSCH. In a multi-carrier system, a plurality of UL CCs can be configured in UE and a plurality of PUSCHs can be scheduled. Here, if the piggyback transmission of UCI is necessary, whether the UCI will be transmitted through what PUSCH is problematic. A method of UE sending UCI when a plurality of DL CCs/UL CCs is configured in the UE in a multi-carrier system is described below.

Figure 14:
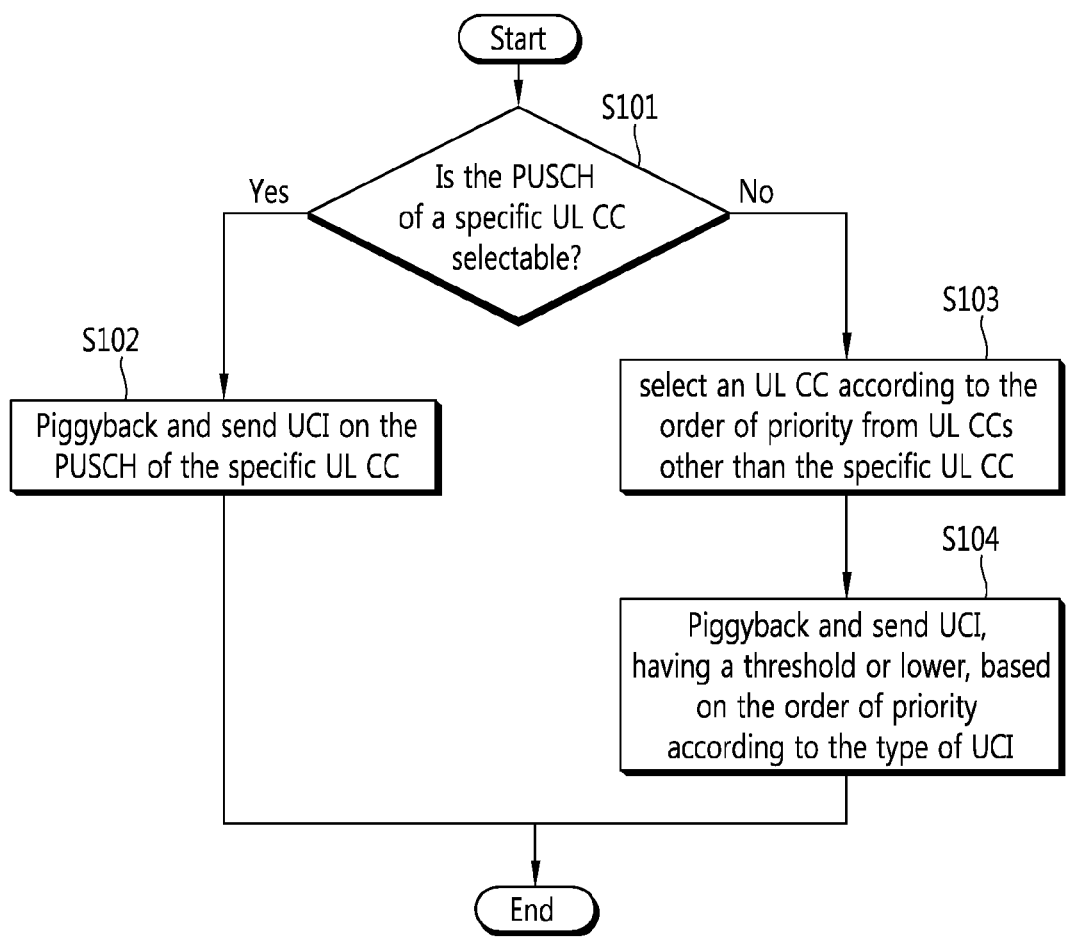
FIG. 14 is a flowchart illustrating a method of UE sending UCI in accordance with an embodiment of the present invention.

FIG. 14 is a flowchart illustrating a method of UE sending UCI in accordance with an embodiment of the present invention.

Referring to FIG. 14, the UE determines whether the PUSCH of a specific UL CC can be selected (S101). Here, the specific UL CC may be, for example, a Primary UL CC (UL PCC). That is, the specific UL CC may be an UL CC in which a PUCCH is transmitted.

If, as a result of the determination, it is determined that the PUSCH of the specific UL CC can be selected, the UE piggybacks and sends UCI on the PUSCH of the specific UL CC (S102). That is, the UE preferentially performs piggyback transmission through the PUSCH of a specific UL CC, such as a primary UL CC.

If, as a result of the determination, it is determined that the PUSCH of the specific UL CC cannot be selected, the UE selects an UL CC according to the order of priority from UL CCs other than the specific UL CC (S103). For example, there is a case where UE has not receive an UL grant for a primary UL CC or the UE has received the UL grant, but may not piggyback UCI because there is a large amount of data to be transmitted in the PUSCH of the primary UL CC. In this case, the UE selects an UL CC according to the order of priority from the remaining UL CCs other than the primary UL CC. A method of selecting an UL CC according to the order of priority is described in detail below.

The UE piggybacks and sends UCI, having a threshold or lower, based on the order of priority according to the type of UCI on the PUSCH of the selected UL CC (S104).

The steps S103 and S104 are described in detail below depending on the type of piggybacked UCI.

I. Piggyback Transmission of Periodic Csi and ACK/NACK

If a periodic CSI and ACK/NACK are sought to be piggybacked and transmitted, the order of priority in the remaining UL CCs other than a primary UL CC may be determined according to 1) the bandwidth of a PUSCH, 2) the MCS of the PUSCH, 3) the CIF of the PUSCH, 4) the transmission mode of the PUSCH, 5) data bits transmitted in the PUSCH, and 6) a predetermined order of priority. Each of the cases is described below.

1) The bandwidth of a PUSCH: This is because to determine the order of priority of UL CCs in order of PUSCHs having a greater bandwidth is advantageous in the piggyback of pieces of increased UCI. If a plurality of DL CCs has been configured in UE and CSI on each DL CC has to be transmitted in one UL subframe, the amount of CSI increases. Furthermore, since ACK/NACK for PDSCHs received in the plurality of DL CCs has also to be transmitted, the number of ACK/NACKs also increases. In order to piggyback and transmit pieces of UCI increased as described above on the PUSCH, a large bandwidth allocated through the PUSCH is advantageous. Accordingly, the order of priority may be assigned to each UL CC in such a way to give the highest order of priority to an UL CC in which a PUSCH having the greatest bandwidth is transmitted.

2) The MCS of a PUSCH: This method is to give a higher order of priority to a PUSCH having a higher modulation order or a higher coding rate in the MCS of the PUSCH. If the modulation order is high, there is an advantage in that smaller resources are used in UCI piggyback.

3) The CIF of a PUSCH: This method is to determine the order of priority based on a CIF in order to facilitate the selection of a PUSCH. For example, a PUSCH transmitted in an UL CC having the greatest CIF or a PUSCH transmitted in an UL CC having the smallest CIF may be selected, and UCI may be piggybacked on the selected PUSCH.

4) The transmission mode of a PUSCH: if the transmission mode of a PUSCH is MIMO mode, data can be transmitted through a plurality of layers according to space multiplexing. In this case, if inter-layer channels have a close correlation, severe interference may occur. Data may be received in a plurality of subframes (e.g., a subframe N and a subframe N+8) using an HARQ process and then combined in order to reduce interference, but it is important to successfully decode UCI, that is, control information, at once. Accordingly, it is not preferred that UCI be piggybacked and transmitted on the PUSCH of an UL CC that has been set in MIMO mode, and a PUSCH on which UCI will be piggybacked preferably is an UL CC that has not been set in MIMO mode. That is, a high order of priority is assigned to the PUSCH of an UL CC that has not been set in MIMO mode.

Or, the order of priority may be assigned in order of a smaller number of layers for the PUSCH of each UL CC or the order of priority may be assigned in order of a smaller number of codewords transmitted. In the case of the same transmission mode, the same number of layers, and the same number of codewords, the order of priority, such as 1, 2, and 3), may be used.

Exceptionally, if ACK/NACK from among pieces of UCI is copied to all layers and transmitted, to send the ACK/NACK through an UL CC set in MIMO mode may be taken into consideration for the purpose of a transmission diversity gain.

5) Data bits transmitted in a PUSCHs: A BS will properly select a code rate, a modulation order, and a bandwidth for the transmission of each PUSCH, and thus UE may determine the amount of UCI that can be piggybacked based on the number of data bits transmitted in the PUSCH. The UE may assign a higher order of priority to a PUSCH having a larger number of data bits.

6) A predetermined order of priority: a BS may designate the order of priority in advance in selecting PUSCHs through a higher layer signal, such as RRC, and UE may select the PUSCHs according to the predetermined order of priority.

If UE is unable to select the PUSCH of a specific UL CC as described above, the UE may attempt UCI piggyback on a PUSCH having the highest order of priority, from among PUSCHs having the order of priority. Here, UCI may not be piggybacked and transmitted on the PUSCH having the highest order of priority as if the UE does not receive an UL grant for the PUSCH having the highest order of priority. In this case, the UE selects a PUSCH having a next order of priority. In this case, the selected PUSCH may have insufficient resources (resource elements) on which the UCI will be piggybacked, or the transmission of data through the selected PUSCH may be influenced by UCI piggyback. Accordingly, when UCI is piggybacked, a threshold may be used in order to limit the transfer amount of UCI. That is, the UE can compare the UCI with the threshold and send the UCI only within the threshold or lower. UCI includes various types of CSI and ACK/NACKs. The order of priority can be assigned to pieces of UCI, and UCI having a high order of priority within a threshold can be first transmitted.

First, the subject of transmission with the highest priority is ACK/NACK, and a periodic CSI may have the order of priority according to the following criteria. i) A transmission period criterion, that is, CSI having the greatest transmission period is preferentially transmitted, ii) a measurement bandwidth criterion, that is, CSI having a greater bandwidth, that is, the subject of measurement, is preferentially transmitted, iii) a criterion according to contents (e.g., the order of priority may be sequentially an RI>a broadband CSI>a subband CSI or RI>a long-term PMI>a short-term PMI), iv) the order of priority according to a DL CC, that is, the subject of measurement (e.g., a periodic CSI on a DL PCC may have the highest order of priority, and a periodic CSI on a DL SCC may have a next order of priority).

II. Aperiodic CSI and ACK/NACK Piggyback.

Like in the piggyback of a periodic CSI and ACK/NACK, if the PUSCH of a specific UL CC can be selected, an aperiodic CSI and ACK/NACK are piggybacked through the PUSCH of the specific UL CC. If the specific UL CC cannot be selected, an aperiodic CSI and ACK/NACK can be piggybacked on the PUSCH of another UL CC having the order of priority.

The order of priority in the PUSCHs of UL CCs other than a specific UL CC, for example, an UL PCC may be determined according to 1) the bandwidth of a PUSCH, 2) the MCS of the PUSCH, 3) the CIF of the PUSCH, 4) the transmission mode of the PUSCH, 5) data bits transmitted in the PUSCH, and 6) a predetermined order of priority.

If UE is unable to select the PUSCH of a specific UL CC even in the piggyback of the aperiodic CSI and ACK/NACK, the UE attempts the piggyback of UCI on a PUSCH having the highest order of priority, from among PUSCHs having the order of priority. If UE does not receive an UL grant for a corresponding PUSCH, the UE selects a PUSCH having a next order of priority. Here, the selected PUSCH may have insufficient resources (resource elements) in piggybacking UCI, or the transmission of data through the selected PUSCH may be influenced by UCI piggyback. Accordingly, a threshold may be placed when piggybacking the UCI in order to limit the transfer amount of the UCI.

In the piggyback of the aperiodic CSI and ACK/NACK, the subject of transmission with the highest order of priority is ACK/NACK, and the aperiodic CSI may be transmitted according to the following transmission method.

i) Channel Coding:

CSI on each DL CC may be subject to channel coding for each CSI on each DL CC with consideration taken of a case where an UL grant including CSI request bit is not received. An aperiodic CSI on each DL CC, that is, UCI transmitted by UE may be subject to channel coding using Tail Biting Convolution Coding (TBCC) having a coding rate of ⅓. For TBCC, reference may be made to section 5.1.3.1 of 3GPP TS. 36.212 V8.7.0 (2009-05).

A channel coding process is performed every aperiodic CSI on each DL CC. This is because, if pieces of CSI for DL CCs are subject to joint coding into one, there is a problem in that the amount of CSI blind decoding is increased because the sum of pieces of CSI is changed depending on whether CSI request for a specific DL CC has been received or not.

ii) Physical Resource Mapping:

CSI on each DL CC may be mapped to physical resources according to the order of priority of a PUSCH that is scheduled by the UL grant of the DL CC. For example, it is assumed that UL grants each including CSI request bit are transmitted in a DL CC1, a DL CC2, and a DL CC3 and the UL grants sequentially schedule a PUSCH 1, a PUSCH 2, and a PUSCH 3. Here, the order of priority if the PUSCHs may be in order of the PUSCH 2, the PUSCH 3, and the PUSCH 1. In this case, pieces of CSI for the three DL CCs may be piggybacked through the PUSCH 2. Here, pieces of piggybacked UCI may be mapped to physical resources in order of an aperiodic CSI on the DL CC2, an aperiodic CSI on the DL CC3, and an aperiodic CSI on the DL CC1.

Furthermore, since UE may do not receive an UL grant including CSI request bit, an aperiodic CSI on each DL CC may include an index indicating that the aperiodic CSI is about what DL CC. The index may be included in all pieces of aperiodic CSI transmitted or may be included in only some pieces of aperiodic CSI for some DL CCs. For example, CSI on a DL CC that is mapped firstly in physical resource mapping may do not include an index, but pieces of CSI mapped to a next position may include an index. A DL CC first mapped in physical resource mapping may be a DL CC that is requested by an UL grant that schedules a PUSCH in which CSI is transmitted.

iii) Order of Priority of Aperiodic CSI and ACK/NACK

The following method may be taken into account.

1. If a threshold on which piggyback can be performed is exceeded, all pieces of UCI are dropped. That is, if the amount of UCI that must be piggybacked exceeds the threshold, both an aperiodic CSI and ACK/NACK may be dropped.

2. Only ACK/NACK is transmitted, and all pieces of aperiodic CSI are dropped. Or, only ACK/NACK and RI/PTI are transmitted, and all pieces of the remaining aperiodic CSI may be dropped. In this case, if a threshold on which all ACK/NACK and RI/PTI can be transmitted is not satisfied, only the ACK/NACK is transmitted.

3. The order of priority is placed in an aperiodic CSI on a primary DL CC, and pieces of unrelated CSI may be dropped or compressed.

The methods may be used to set the order of priority of UCI piggyback for all CCs without placing the highest order of priority in the PUSCH of a specific CC.

The methods of piggybacking and transmitting an aperiodic CSI and ACK/NACK may have the following modified examples.

First, the PUSCH of a specific UL CC is selected and UCI is piggybacked and transmitted on the PUSCH, but if the PUSCH of the specific UL CC cannot be selected, a PUSCH can be selected according to the order of priority from among PUSCHs scheduled by an UL grant requesting an aperiodic CSI. A difference between the above-described method and this method is that a PUSCH is not selected according to the order of priority from all UL CCs other than an UL PCC, but one PUSCH is selected according to the order of priority from the PUSCHs of UL CCs that are scheduled by a plurality of UL grants that request an aperiodic CSI.

The order of priority for the PUSCHs scheduled by the UL grant may be determined according to 1) the bandwidth of a PUSCH, 2) the MCS of the PUSCH, 3) the CIF of the PUSCH, 4) the transmission mode of the PUSCH, 5) data bits transmitted in the PUSCH, and 6) a predetermined order of priority. Furthermore, the order of priority and a physical mapping method according to the type of UCI may adopt the same method described in the aperiodic CSI and ACK/NACK piggyback.

As another modified example, there is a method of selecting one PUSCH according to the order of priority from PUSCHs scheduled by an UL grant that requests an aperiodic CSI. A difference between the above-described methods and this method is that the highest order of priority is not assigned to the PUSCH of a specific UL CC, such as an UL PCC, but the order of priority is applied to UL CCs scheduled by an UL grant, from among all UL CCs. The order of priority for the PUSCHs scheduled by the UL grant may be determined according to 1) the bandwidth of the PUSCH, 2) the MCS of the PUSCH, 3) the CIF of the PUSCH, 4) the transmission mode of the PUSCH, 5) data bits transmitted in the PUSCH, and 6) a predetermined order of priority. Furthermore, the order of priority and a physical mapping method according to the type of UCI may adopt the same method described in the aperiodic CSI and ACK/NACK piggyback.

As yet another embodiment, an aperiodic CSI requested by each UL grant may be transmitted in each PUSCH scheduled by each UL grant that requests the aperiodic CSI, from among UL CCs. That is, the pieces of aperiodic CSI for the plurality of DL CCs are not transmitted in one PUSCH, but the CSI of a DL CC corresponding to an UL CC transmitted in a corresponding PUSCH is transmitted in each PUSCH scheduled by each UL grant.

Here, if ACK/NACK has to be sent, a PUSCH on which the ACK/NACK is piggybacked and transmitted may be determined according to the following rule.

1) A method of first selecting a specific UL CC, 2) the bandwidth of a PUSCH, 3) the MCS of the PUSCH, 4) the CIF of the PUSCH, 5) the transmission mode of the PUSCH, 6) data bits transmitted in the PUSCH, and 7) a predetermined order of priority.

In relation to ACK/NACK, in order to prevent pieces of UCI from being distributed and transmitted, one PUSCH may be selected according to the order of priority from PUSCHs in which pieces of aperiodic CSI are transmitted. In order to reduce the influence of data due to UCI piggyback, one PUSCH may be selected according to the order of priority from PUSCHs in which an aperiodic CSI is not transmitted. Or, one PUSCH may be selected according to the order of priority from all UL CCs irrespective of whether an aperiodic CSI is transmitted or not. An aperiodic CSI and ACK/NACK can be piggybacked and transmitted on a PUSCH determined according to the order of priority.

III. Piggyback of Aperiodic CSI, Periodic Csi, and ACK/NACK

There may be a case where an aperiodic CSI, a periodic CSI, and ACK/NACK are reserved for transmission in the same subframe. In a single carrier system, if a subframe in which a periodic CSI is reserved for transmission is identical with a subframe in which an aperiodic CSI is requested to be transmitted, the periodic CSI is dropped and only the aperiodic CSI is transmitted. In a multi-carrier system, however, this conventional method cannot be used without change because there is no guarantee that the periodic CSI and the aperiodic CSI are necessarily for the same DL CC. If the periodic CSI is dropped and only the aperiodic CSI is transmitted, the same method as the piggyback method of an aperiodic CSI and ACK/NACK is used. A method of transmitting UCI when it is necessary to piggyback an aperiodic CSI, a periodic CSI, and ACK/NACK in the same subframe is described below.

1. PUSCH Selection Method Applied to the Piggyback of an Aperiodic CSI and ACK/NACK is Used An aperiodic CSI is triggered when UE receives an UL grant including CSI request bit. When UE receives the UL grant, the transmission of an aperiodic CSI according to the UL grant is certainly reserved. Accordingly, in this case, an aperiodic CSI, a periodic CSI, and ACK/NACK can be piggybacked and transmitted through a PUSCH selected according to the transmission method described in connection with the piggyback of an aperiodic CSI and ACK/NACK.

2. PUSCH Selection Method Applied to the Piggyback of a Periodic CSI and ACK/NACK is Used This method is for piggyback and transmission through a PUSCH selected according to the method described in connection with the piggyback of a periodic CSI and ACK/NACK if a periodic CSI and an aperiodic CSI are sought to be transmitted through one PUSCH or if three types of UCI are sought to be piggybacked and transmitted. This method is disadvantageous in that it includes a variety of assumptions because whether an aperiodic CSI and a periodic CSI will be simultaneously transmitted or not is determined depending on whether an UL grant requesting the aperiodic CSI has been received or not.

3. Periodic CSI and Aperiodic CSI Use Respective PUSCH Selection Methods

This method is a method of sending a periodic CSI through a PUSCH selected according to the above-described periodic CSI and ACK/NACK piggyback method and sending an aperiodic CSI through a PUSCH selected according to the above-described aperiodic CSI and ACK/NACK piggyback method.

Even in the piggyback of a periodic CSI, an aperiodic CSI, and ACK/NACK, a BS schedules a bandwidth and MCS that are sufficient for UCI piggyback through a PUSCH having the highest order of priority. If UE does not receive an UL grant for the PUSCH, the UE selects a PUSCH having a next order of priority. Here, the selected PUSCH may have insufficient resources (resource elements) in piggybacking UCI, or the transmission of data through the selected PUSCH may be influenced by UCI piggyback. Accordingly, in this case, a threshold may be placed when piggybacking UCI in order to limit the transfer amount of the UCI.

The subject of transmission with the highest order of priority is ACK/NACK from among pieces of UCI due to the limit of the threshold, and the order of priority may be in order of an RI/PTI, an aperiodic CSI (excluding an RI/PTI), and a periodic CSI (excluding an RI/PTI).

Furthermore, CSI on each DL CC may be subject to channel coding for each DL CC with consideration taken of a case where an UL grant including CSI request bit is not received. Furthermore, CSI on each DL CC may be mapped to physical resources according to the order of priority of PUSCHs that are scheduled by the UL grant of each DL CC. For example, it is assumed that UL grants each including CSI request bit are transmitted in a DL CC1, a DL CC2, and a DL CC3 and the UL grants schedule a PUSCH 1, a PUSCH 2, and a PUSCH 3 sequentially. Here, the order of priority of the PUSCHs may be in order of the PUSCH 2, the PUSCH 3, and the PUSCH 1. For example, a plurality of pieces of UCI piggybacked on the PUSCH 2 may be mapped to or disposed in physical resources in order of the CSI on the DL CC2, the CSI on the DL CC3, and the CSI on the DL CC1.

Furthermore, CSI on each DL CC may include an index indicating whether the CSI is about CSI on what DL CC because UE may not receive an UL grant including CSI request bit. The index may be included in all pieces of transmitted CSI or may be included in only some pieces of CSI for some DL CCs. For example, CSI on a DL CC that is mapped firstly in physical resource mapping may do not include an index, but pieces of CSI mapped to a next position may include an index. A DL CC first mapped in physical resource mapping may be a DL CC that is requested by an UL grant that schedules a PUSCH in which CSI is transmitted.

A method used when a periodic CSI, an aperiodic CSI, and ACK/NACK have to be piggybacked and transmitted is as follows.

If a threshold on which piggyback can be performed is exceeded, all pieces of UCI are dropped. That is, if the amount of UCI that must be piggybacked exceeds the threshold, all a periodic CSI, an aperiodic CSI, and ACK/NACK may be dropped.

2. Only ACK/NACK is transmitted, and both a periodic CSI and an aperiodic CSI are dropped. Or, only ACK/NACK and an RI/PTI may be transmitted, and all pieces of the remaining CSI may be dropped. In this case, if a threshold on which all the ACK/NACK and the RI/PTI can be transmitted is not satisfied, only the ACK/NACK can be transmitted.

3. The order of priority is ACK/NACK>an aperiodic CSI>a periodic CSI. The periodic CSI is first dropped until the threshold is satisfied according to the order of priority. Even when the threshold is still not satisfied, the aperiodic CSI is dropped. If the threshold is still not satisfied, the ACK/NACK may be finally dropped. In the state in which the ACK/NACK must be dropped, a method of sending the ACK/NACK through a PUCCH and dropping the transmission of the PUSCH itself may be taken into consideration.

4. The order of priority may be placed in an aperiodic CSI on a primary DL CC (DL PCC), and pieces of CSI not belonging to the order of priority may be dropped or compressed.

The methods may be used to set the order of priority of UCI piggyback for all CCs without placing the highest order of priority in the PUSCH of a specific CC.

IV. In the Case of Semi-Persistent Scheduling (SPS)

In the case of uplink, UE automatically retransmits data even without an UL grant until a BS sends ACK after the initial transmission of data in response to a synchronization HARQ. Likewise in the case of SPS, when initial SPS is set by a higher layer signal, such as RRC, automatic retransmission is performed even without an UL grant. In the case of a PUSCH transmitted without an UL grant, if a UE does not receive an UL grant regarding retransmission when a BS changes resources through the UL grant, transmission is erroneously performed through the existing configured resources. Accordingly, it is preferred that UCI be piggybacked on a corresponding PUSCH when certain PUSCH resources are scheduled in response to an UL grant. The order of priority in selecting a PUSCH including an UL grant or a PUSCH not including an UL grant may be determined according to the above-described rules for the order of priority, that is, 1) the bandwidth of a PUSCH, 2) the MCS of the PUSCH, 3) the CIF of the PUSCH, 4) the transmission mode of the PUSCH, 5) data bits transmitted in the PUSCH, and 6) a predetermined order of priority.

Figure 15:
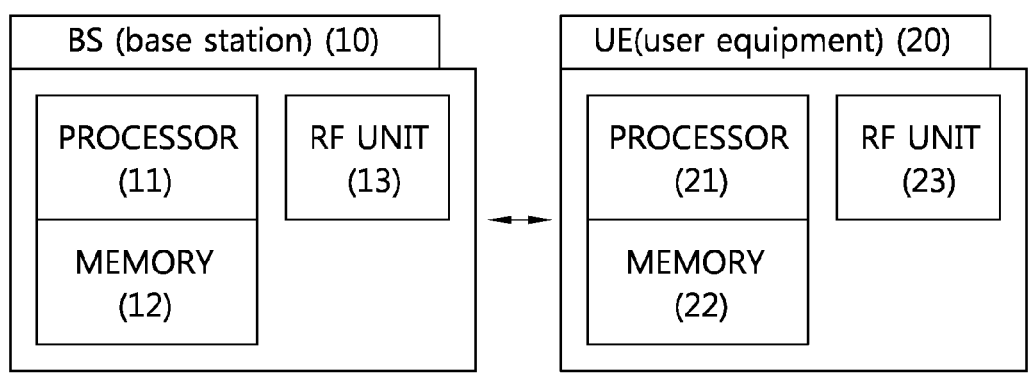
FIG. 15 is a block diagram showing a BS and UE in which an embodiment of the present invention is implemented.

FIG. 15 is a block diagram showing a BS and UE in which an embodiment of the present invention is implemented.

The BS 100 includes a processor 110, memory 120, and a Radio Frequency (RF) unit 130. The processor 110 implements the proposed functions, processes and/or methods. The layers of a radio interface protocol can be implemented by the processor 110. The processor 110 can send an uplink grant to UE and receive UCI from the UE. The memory 120 is connected with the processor 110, and the memory 120 stores various pieces of information for driving the processor 110. The RF unit 130 is connected with the processor 110, and the RF unit 130 sends and/or receives radio signals.

The UE 200 includes a processor 210, memory 220, and an RF unit 230. The processor 210 implements the proposed functions, processes and/or methods. The layers of a radio interface protocol can be implemented by the processor 210. The processor 210 generates Uplink Control Information (UCI) in which a DL CC configured in the UE is the subject of measurement object and selects the PUSCH of one UL CC according to the order of priority from PUSCHs of two or more UL CCs configured in the UE. A method of selecting the PUSCH has been described above. The processor 210 sends UCI through the PUSCH of the selected UL CC. The memory 220 is connected with the processor 210, and the memory 220 stores various pieces of information for driving the processor 210. The RF unit 230 is connected with the processor 210, and the RF unit 230 sends and/or receives radio signals and sends the spread complex modulation symbols to a BS.

The processor 110, 210 may include Application-Specific Integrated Circuits (ASICs), other chipsets, logic circuits and/or data processors. The memory 120, 220 may include Read-Only Memory (ROM), Random Access Memory (RAM), flash memory, memory cards, storage media and/or other storage devices. The RF unit 130, 230 may include a baseband circuit for processing radio signals. When the embodiment is implemented in software, the above-described scheme may be implemented into a module (process or function) that performs the above function. The module may be stored in the memory 120, 220 and executed by the processor 110, 210. The memory 120, 220 may be placed inside or outside the processor 110, 210 and connected to the processor 110, 210 using a variety of well-known means. In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and other steps may be included or one or more steps of the flowcharts may be deleted without affecting the scope of the present invention.

The above embodiments include various aspects of examples. Although all possible combinations for describing the various aspects may not be described, those skilled in the art may appreciate that other combinations are possible. Accordingly, the present invention should be construed as including all other replacements, modifications, and changes which fall within the scope of the claims.

The invention claimed is:

1. A method for transmitting Uplink Control Information (UCI), performed by user equipment, in a multi-carrier system, the method comprising:
generating UCI for measuring a downlink component carrier (DL CC) configured in the user equipment;
selecting a physical uplink shared channel (PUSCH) of one uplink component carrier according to an order of priority from PUSCHs of two or more uplink component carriers configured in the user equipment; and
transmitting the UCI through the PUSCH of the selected uplink component carrier,
wherein if acknowledgement (ACK)/non-acknowledgement (NACK), aperiodic Channel Status Information (CSI) and periodic CSI are included in the UCI transmitted by the user equipment, an order of priority in transmission is in order of the ACK/NACK, the aperiodic CSI and the periodic CSI, and
wherein if the PUSCH of the selected uplink component carrier is not a PUSCH having a highest order of priority and has insufficient resources for transmitting all of the ACK/NACK, the aperiodic CSI and the periodic CSI, the ACK/NACK is firstly transmitted through the PUSCH of the selected uplink component carrier.

2. The method of claim 1, wherein a PUSCH in which largest data bits are transmitted is selected from the PUSCHs of the two or more uplink component carriers.

3. The method of claim 1, further comprising:
receiving uplink grants each requesting CSI feedback for each of a plurality of DL CCs if the plurality of DL CCs is configured in the user equipment,
wherein the UCI comprises the CSI on each of the plurality of DL CCs.

4. The method of claim 3, wherein a physical deployment of the CSI on each of the plurality of DL CCs included in the UCI transmitted through the PUSCH of the selected uplink component carrier is determined according to the order of priority of the PUSCHs scheduled by the uplink grants.

5. The method of claim 4, wherein the CSI on each of the plurality of DL CCs comprises an index indicating that the CSI is CSI on what DL CC.

6. User equipment, comprising:
a Radio Frequency (RF) unit sending or receiving radio signals; and
a processor coupled with the RF unit,
wherein the processor generates UCI for measuring a configured downlink component carrier (DL CC), selecting a physical uplink shared channel (PUSCH) of one uplink component carrier according to an order of priority from PUSCHs of two or more uplink component carriers configured, and transmitting the UCI through the PUSCH of the selected uplink component carrier,
wherein if acknowledgement (ACK)/non-acknowledgement (NACK), aperiodic Channel Status Information (CSI) and periodic CSI are included in the UCI transmitted by the user equipment, an order of priority in transmission is in order of the ACK/NACK, the aperiodic CSI and the periodic CSI, and
wherein if the PUSCH of the selected uplink component carrier is not a PUSCH having a highest order of priority and has insufficient resources for transmitting all of the ACK/NACK, the aperiodic CSI and the periodic CSI, the ACK/NACK is firstly transmitted through the PUSCH of the selected uplink component carrier.

7. The user equipment of claim 6, wherein a PUSCH in which largest data bits are transmitted is selected from the PUSCHs of the two or more uplink component carriers.

8. The user equipment of claim 6, wherein, the processor receives uplink grants each requesting CSI feedback for each of a plurality of DL CCs if the plurality of DL CCs is configured in the user equipment, wherein the UCI comprises the CSI on each of the plurality of DL CCs.

9. The user equipment of claim 8, wherein a physical deployment of the CSI on each of the plurality of DL CCs included in the UCI transmitted through the PUSCH of the selected uplink component carrier is determined according to the order of priority of the PUSCHs scheduled by the uplink grants.

10. The user equipment of claim 9, wherein the CSI on each of the plurality of DL CCs comprises an index indicating that the CSI is CSI on what DL CC.

* * * * *